(12) United States Patent
Nekado et al.

(10) Patent No.: US 6,668,996 B2
(45) Date of Patent: Dec. 30, 2003

(54) ELECTROMAGNETIC CLUTCH

(75) Inventors: Yasuo Nekado, Kanagawa (JP); Masaaki Kusumi, Kanagawa (JP); Ken Onoe, Tokyo (JP); Akihiro Iwazaki, Saitama (JP); Koji Matsubara, Saitama (JP); Shinji Ohkuma, Saitama (JP); Tatsuhiro Tomari, Saitama (JP); Shinichi Inagawa, Saitama (JP)

(73) Assignees: Sony Precision Technology Inc., Tokyo (JP); Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/188,457

(22) Filed: Jul. 2, 2002

(65) Prior Publication Data
US 2003/0019711 A1 Jan. 30, 2003

(30) Foreign Application Priority Data
Jul. 13, 2001 (JP) ........................................ 2001-214291

(51) Int. Cl.⁷ ........................ F16D 27/115; F16D 27/02; G01R 32/02
(52) U.S. Cl. ................................ 192/84.91; 192/30 W; 192/84.93
(58) Field of Search .............................. 192/84.1, 84.91, 192/84.93, 84.96, 30 W

(56) References Cited

U.S. PATENT DOCUMENTS

| 4,340,133 | A | * | 7/1982 | Blersch | .................... | 192/30 W |
| 4,572,343 | A | * | 2/1986 | Boffelli | .................... | 192/56.41 |
| 5,152,383 | A | * | 10/1992 | Boyer et al. | ............. | 192/58.61 |
| 5,893,441 | A | * | 4/1999 | Reeb | ......................... | 192/58.43 |
| 6,603,307 | B2 | * | 8/2003 | Sekiya et al. | ................ | 324/225 |
| 6,607,061 | B2 | * | 8/2003 | Hori et al. | ................ | 192/84.91 |

FOREIGN PATENT DOCUMENTS

JP  4-312217  11/1992  ........... F16D/27/16

* cited by examiner

*Primary Examiner*—Saul Rodriguez
(74) *Attorney, Agent, or Firm*—Haverstock & Owens LLP

(57) ABSTRACT

Two sensors are provided on a clutch core. Sensor coils are driven at a high frequency by a high-frequency driving circuit. As the sensors sense a magnetic flux of a magnetic circuit including the clutch core and an armature, the impedance of the sensor coils changes. In accordance with the outputs from the sensor coils at this point, an impedance detecting circuit detects the impedance of the sensor coils. Then, an impedance combining circuit combines the impedance of the sensor coils. On the basis of the combined impedance, a current control circuit controls a current supplied to an exciting coil. Thus, the attracting force of the armature to the core excited by the exciting coil is controlled.

1 Claim, 30 Drawing Sheets

ELECTROMAGNETIC CLUTCH

BACKGROUND OF THE INVENTION

1. Field of the Invention

This invention relates to an electromagnetic clutch which is connected by attracting an armature to a core excited by an exciting coil, and particularly to an electromagnetic clutch in which the connecting force can be controlled.

2. Description of the Related Art

Conventionally, there has been known a technique of providing a driving force distributing device having two clutches in an activating device, distributing the driving force of an engine to left and right driving wheels via the driving force distributing device, and increasing the driving force distributed to a gyratory outer wheel while decreasing the driving force distributed to the gyratory inner wheel, thereby generating a yaw moment in the gyrating direction and improving the gyration performance. A technique in which these two clutches are made up of electromagnetic clutches is disclosed in the Japanese Publication of Unexamined Patent Application No.H4-312217.

The electromagnetic clutch has a clutch core 201, an exciting coil 202, and an armature 203, as shown in FIG. 1. A pressure plate 204 is provided with its one major surface facing a major surface of the clutch core 201 which is opposite to its aperture side. From the pressure plate 204, a transfer member 205 is extended along the lateral side of the clutch core 201. The transfer member 205 is welded to the armature 202.

In this electromagnetic clutch, a magnetic flux density sensor is provided in order to detect the connecting force and perform feed-back control of the duty of a current supplied to the coil. The magnetic flux density sensor detects, by using a Hall element, the leakage flux quantity of a magnetic circuit including the clutch core 201 and the armature 203, and estimates the magnetic flux density of the magnetic circuit from the leakage flux quantity, thus controlling the current flowing through the exciting coil.

However, when connecting the above-described electromagnetic clutch C, the armature 203 might be inclined with respect to the major surface of the clutch core 201 instead of being parallel to the major surface thereof and might be attracted to the clutch core 201 in this state, because of the wear of the clutch disc and depending on how closely the armature 203 and the transfer member 205 fit each other. When the armature 203 is inclined with respect to the major surface of the clutch core 201 and is attracted to the clutch core 201 in this state, the magnetic flux density sensor cannot accurately measure the attracting force of the armature 203 to the clutch core 201.

When the armature 203 is inclined with respect to the major surface of the clutch core 201 and is attracted to the clutch core 201 in this state, the attracting force of the armature 203 to the clutch core 201 is erroneously measured and the connecting force of the electromagnetic clutch C cannot be accurately controlled.

SUMMARY OF THE INVENTION

It is an object of the present invention to provide an electromagnetic clutch in which the attracting force of an armature to a core can be accurately controlled even when the core and the armature are not parallel to each other.

An electromagnetic clutch according to one embodiment of the present invention comprises: a core made of a magnetic material; an exciting coil for exciting the core; an armature arranged at a position facing one major surface of the core and adapted for being attracted to the core by a predetermined connecting force in accordance with a current supplied to the exciting coil; a plurality of magnetic flux measuring means, each having magnetically sensitive means and adapted for measuring the magnetic flux quantity of a magnetic circuit including the core and the armature; and control means for controlling the current flowing through the exciting coil in accordance with the result of the measurement by each of the magnetic flux measuring means and setting a predetermined connecting force as the connecting force of the armature to the core; each of the magnetically sensitive means being provided in the circumferential direction so that the magnetic flux density of the magnetic circuit is controlled in accordance with an output signal from each magnetically sensitive means.

In the electromagnetic clutch according to the present invention, a plurality of magnetic flux measuring means, each having magnetically sensitive means and adapted for measuring the magnetic flux quantity of a magnetic circuit including the core and the armature, are provided in the circumferential direction. Therefore, in the electromagnetic clutch according to the present invention, the magnetic flux quantity can be measured at a plurality of positions in the magnetic circuit.

An electromagnetic clutch according to another embodiment of the present invention comprises: a core made of a magnetic material; an exciting coil for exciting the core; an armature arranged at a position facing one major surface of the core and adapted for being attracted to the core by a predetermined connecting force in accordance with a current supplied to the exciting coil; magnetic flux measuring means having magnetically sensitive means and adapted for measuring the magnetic flux quantity of a magnetic circuit including the core and the armature; and control means for controlling the current flowing through the exciting coil in accordance with the result of the measurement by the magnetic flux measuring means and setting a predetermined connecting force as the connecting force of the armature to the core; the magnetically sensitive means being provided on the entire circumference in the circumferential direction of the core.

In the electromagnetic clutch according to the present invention, magnetic flux measuring means having magnetically sensitive means and adapted for measuring the magnetic flux quantity of a magnetic circuit including the core and the armature is provided on the entire circumference in the circumferential direction of the core. Therefore, in the electromagnetic clutch according to the present invention, the magnetic flux quantity of the magnetic circuit can be measured on the entire circumference in the circumferential direction of the core.

An electromagnetic clutch according to still another embodiment of the present invention comprises: a core made of a magnetic material; an exciting coil for exciting the core; an armature arranged at a position facing one major surface of the core and adapted for being attracted to the core by a predetermined connecting force in accordance with a current supplied to the exciting coil; current detecting means for detecting the current flowing through the exciting coil; a plurality of gap detecting means, each having position detecting means and adapted for detecting the distance between the core and the armature; and control means for correcting the relation between the attracting force between the armature and the core and the current flowing through the exciting coil in accordance with the result of the detection by the current detecting means and the result of the detection by each of the gap detecting means, and thus controlling the current flowing through the exciting coil; each of the position detecting means being provided in the circumferential direction of the core or the armature so that the current supplied to the exciting coil is determined in accordance with an output signal from each position detecting means.

In the electromagnetic clutch according to the present invention, a plurality of gap detecting means, each having a position detecting means and adapted for detecting the distance between the core and the armature, are provided in the circumferential direction. Therefore, in the electromagnetic clutch according to the present invention, the distance between the core and the armature can be measured at a plurality of positions.

An electromagnetic clutch according to yet another embodiment of the present invention comprises: a core made of a magnetic material; an exciting coil for exciting the core; an armature arranged at a position facing one major surface of the core and adapted for being attracted to the core by a predetermined connecting force in accordance with a current supplied to the exciting coil; current detecting means for detecting the current flowing through the exciting coil; gap detecting means having position detecting means and adapted for detecting the distance between the core and the armature; and control means for correcting the relation between the attracting force between the armature and the core and the current flowing through the exciting coil in accordance with the result of the detection by the current detecting means and the result of the detection by the gap detecting means, and thus controlling the current flowing through the exciting coil; the position detecting means being provided on the entire circumference in the circumferential direction of the core.

In the electromagnetic clutch according to the present invention, gap detecting means having position detecting means and adapted for detecting the distance between the core and the armature is provided on the entire circumference in the circumferential direction of the core. Therefore, in the electromagnetic clutch according to the present invention, the distance between the core and the armature can be measured on the entire circumference of the core.

Thus, in the electromagnetic clutch of the present invention, the magnetic flux quantity of the magnetic circuit can be accurately measured even when the magnetic flux does not vary. In the electromagnetic clutch of the present invention, since the plurality of magnetically sensitive means are provided, the impedance corresponding to the magnetic flux quantity can be measured at a plurality of positions in the magnetic circuit including the clutch core and the armature. The control means controls the current supplied to the exciting coil on the basis of the result of combination of the impedance of the plurality of positions.

Moreover, in the electromagnetic clutch of the present invention, the magnetically sensitive means is provided on the entire circumference in the circumferential direction of the core. Thus, the magnetic flux measuring means can measure the impedance corresponding to the quantity of the magnetic flux passing through a predetermined area including the center of the one major surface of the core facing the armature. The control means controls the current supplied to the exciting coil on the basis of the impedance.

Moreover, in the electromagnetic clutch of the present invention, since the plurality of gap detecting means are provided, the relative position between the armature and the core is detected at a plurality of positions in the electromagnetic clutch. The control means controls the current supplied to the exciting coil on the basis of the result of combination of the relative positions detected by the plurality of gap detecting means.

Furthermore, in the electromagnetic clutch of the present invention, the position detecting means is provided on the entire circumference in the circumferential direction of the core. That is, the gap detecting means detects the relative position between the armature and the clutch core in a predetermined area including the center of the one major surface of the core facing the armature. The control means control the current supplied to the exciting coil on the basis of the detected relative position.

Therefore, in the electromagnetic clutch of the present invention, the attracting force of the armature to the clutch core can be accurately measured even when the armature is inclined with respect to the clutch core and is attracted thereto in the inclined state. That is, in the electromagnetic clutch of the present invention, the connecting force can be accurately controlled even when the armature is inclined with respect to the clutch core and is attracted thereto in the inclined state.

DESCRIPTION OF THE PREFERRED EMBODIMENTS

The electromagnetic clutch to which the present invention is applied will now be described in detail with reference to the drawings.

First, a driving force distributing device using the electromagnetic clutch to which the present invention is applied will be described.

Figure 1:
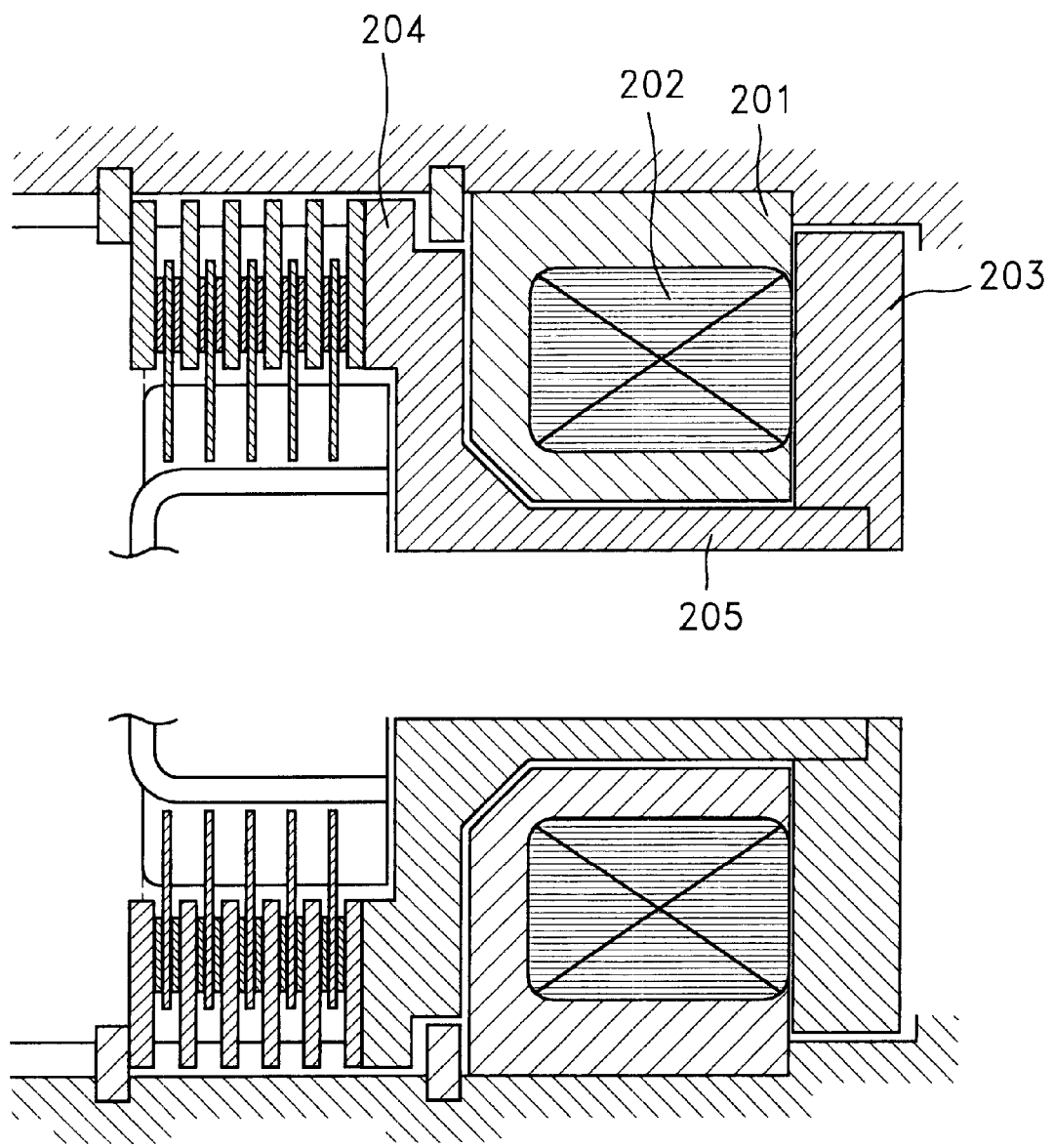
FIG. 1 is a cross-sectional view showing a conventional electromagnetic clutch.
Figure 2:
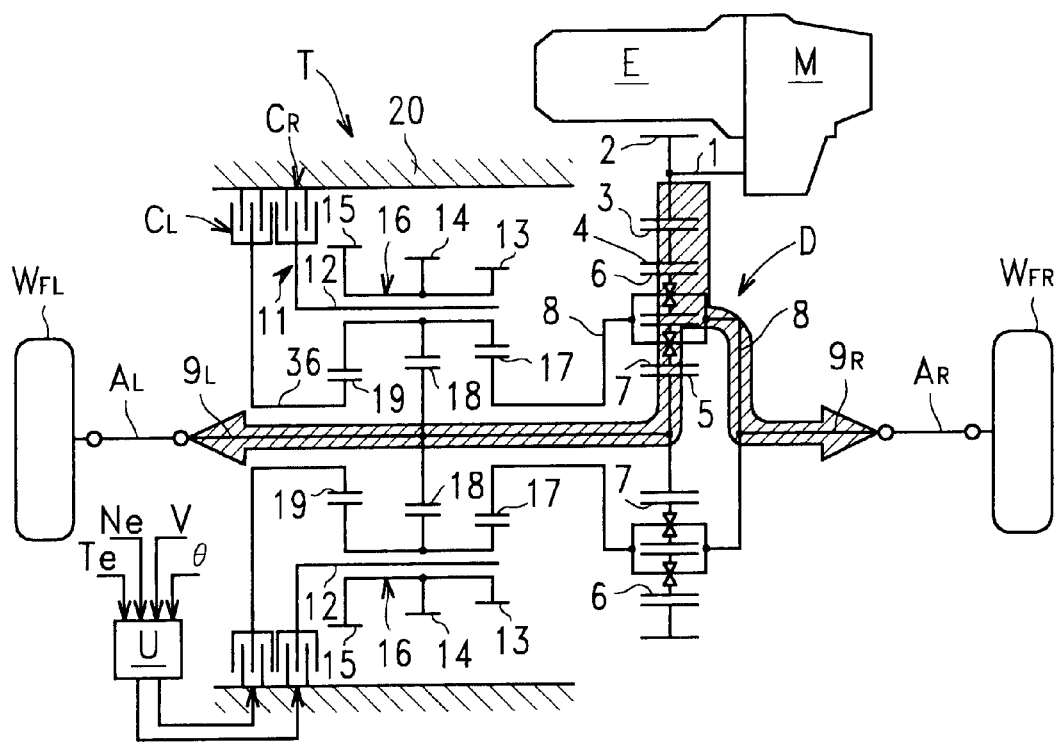
FIG. 2 shows the structure of a driving force distributing device having mounted thereon an electromagnetic clutch to which the present invention is applied.

As shown in FIG. 2, a transmission M is connected to the right end of an engine E which is horizontally mounted on the front part of the body of a front-engine front-drive vehicle, and a driving force distributing device T is arranged behind the engine E and the transmission M. A left front wheel $W_{FL}$ and a right front wheel $W_{FR}$ are connected with a left drive shaft $A_L$ and a right drive shaft $A_R$, respectively, extending from the left and right ends of the driving force distributing device T.

The driving force distributing device T has an activating device D to which a driving force is transmitted from an outer-cog gear 3 meshed with an input gear 2 provided on an input shaft 1 extending from the transmission M. The activating device D is made up of a double-pinion planetary mechanism. This planetary mechanism is constituted by a ring gear 4 formed integrally with the outer-cog gear 3, a sun gear 5 provided on the inner side of and coaxially with the ring gear 4, an outer planet gear 6 meshed with the ring gear 4, an inner planet gear 7 meshed with the sun gear 5, and a planet carrier 8 for supporting the outer planet gear 6 and the inner planet gear 7 in the mutually meshed state. In the activating device D, the ring gear 4 functions as an input element and the sun gear 5 functioning as one output element is connected to the left front wheel $W_{FL}$ via a left output shaft $9_L$. The planet carrier 8 functioning as the other output element is connected to the right front wheel $W_{FR}$ via a right output shaft $9_R$.

A carrier member 11 rotatably supported on the outer circumference of the left output shaft $9_L$ has four pinion shafts arranged at an interval of 90 degrees in the circumferential direction. A three-connected pinion member 16 made up of integrally formed first pinion 13, second pinion 14 and third pinion 15 is rotatably supported by each pinion shaft 12.

The first pinion 13, the second pinion 14, the third pinion 15, a first sun gear 17, a second sun gear 18 and a third sun gear 19 in this embodiment each have the following number of cogs.

| | |
|---|---|
| The number of cogs of the first pinion 13 | $Z_2 = 17$ |
| The number of cogs of the second pinion 14 | $Z_4 = 17$ |
| The number of cogs of the third pinion 15 | $Z_2 = 34$ |
| The number of cogs of the first sun gear 17 | $Z_1 = 32$ |
| The number of cogs of the second sun gear 18 | $Z_3 = 28$ |
| The number of cogs of the third sun gear 19 | $Z_1 = 32$ |

The third sun gear 19 is connectable to a housing 20 via a left electromagnetic clutch $C_L$, and the number of rotations of the carrier member 11 is increased by the engagement of the left electromagnetic clutch $C_L$. The carrier member 11 is connectable to the housing 20 via a right electromagnetic clutch $C_R$, and the number of rotations of the carrier member 11 is decreased by the engagement of the right electromagnetic clutch $C_R$. The right electromagnetic clutch $C_R$ and the left electromagnetic clutch $C_L$ are controlled by an electronic control unit U including a microcomputer.

The electronic control unit U calculates the engine torque Te, the number of rotations of the engine Ne, the vehicle speed V and the steering angle θ on the basis of a predetermined program and thus controls the right electromagnetic clutch $C_R$ and the left electromagnetic clutch $C_L$.

Figure 3:
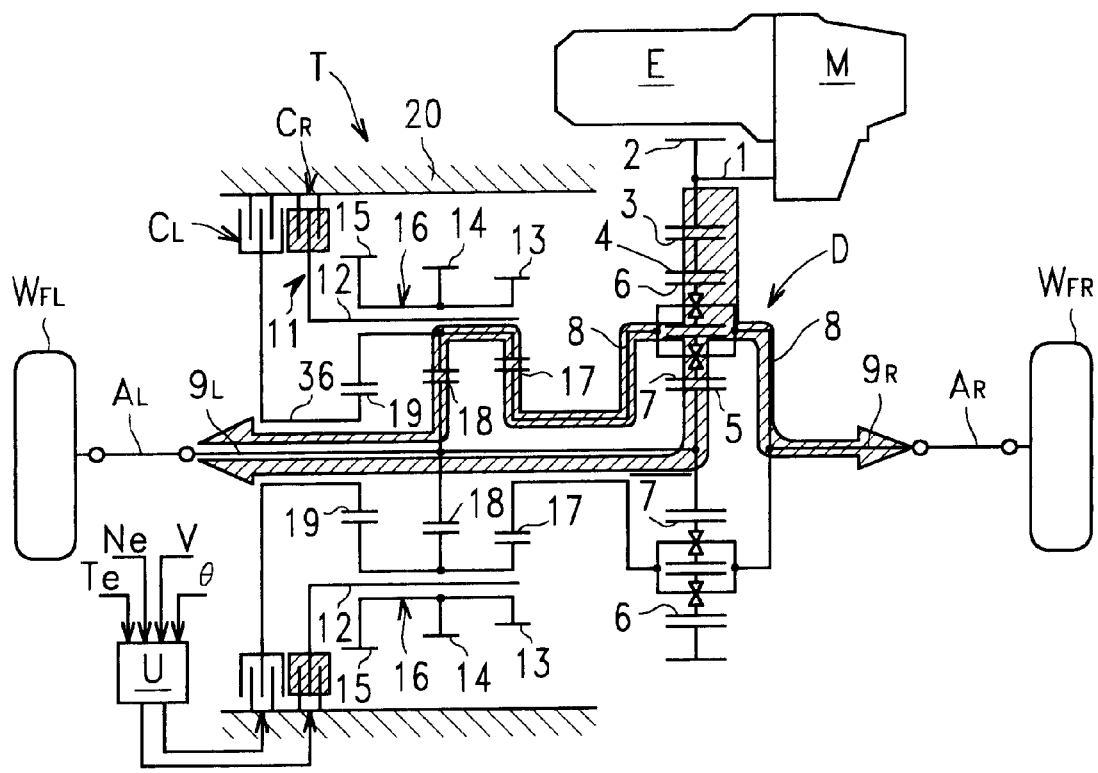
FIG. 3 shows an action at the time of right gyration in a medium-to-low speed range of the driving force distributing device.

In right gyration in the medium-to-low speed range of the vehicle, the right electromagnetic clutch $C_R$ is engaged to connect the carrier member 11 with the housing 20 in response to a command from the electronic control unit U, thus stopping the carrier member 11, as shown in FIG. 3. At this point, since the left output shaft $9_L$ integrated with the left front wheel $W_{FL}$ and the right output shaft $9_R$ integrated with the right front wheel $W_{FR}$ (i.e., the planet carrier 9 of the activating device D) are connected with each other via the second sun gear 18, the second pinion 14, the first sun gear 17 and the first pinion 13, the number of rotations $N_L$ of the left front wheel $W_{FL}$ is increased in the relation expressed by the following equation (1) with respect to the number of rotations $N_R$ of the right front wheel $W_{FR}$.

$$N_L/N_R=(Z_4/Z_3)\times(Z_1/Z_2)=1.143 \qquad (1)$$

As the number of rotations $N_L$ of the left front wheel $W_{FL}$ increases with respect to the number of rotations $N_R$ of the right front wheel $W_{FR}$ as described above, a part of the torque of the right front wheel $W_{FR}$, which is the gyratory inner wheel, can be transmitted to the left front wheel $W_{FL}$, which is the gyratory outer wheel, as indicated by a shaded arrow in FIG. 2.

By appropriately adjusting the connecting force of the right electromagnetic clutch $C_R$ and decreasing the number of rotations of the carrier member 11, instead of stopping the carrier member 11 by the right electromagnetic clutch $C_R$, the number of rotations $N_L$ of the left front wheel $W_{FL}$ can be increased with respect to the number of rotations $N_R$ of the right front wheel $W_{FR}$ in accordance with the decrease and an arbitrary torque can be transmitted from the right front wheel $W_{FR}$, which is the gyratory inner wheel, to the left front wheel $W_{FL}$, which is the gyratory outer wheel.

Figure 4:
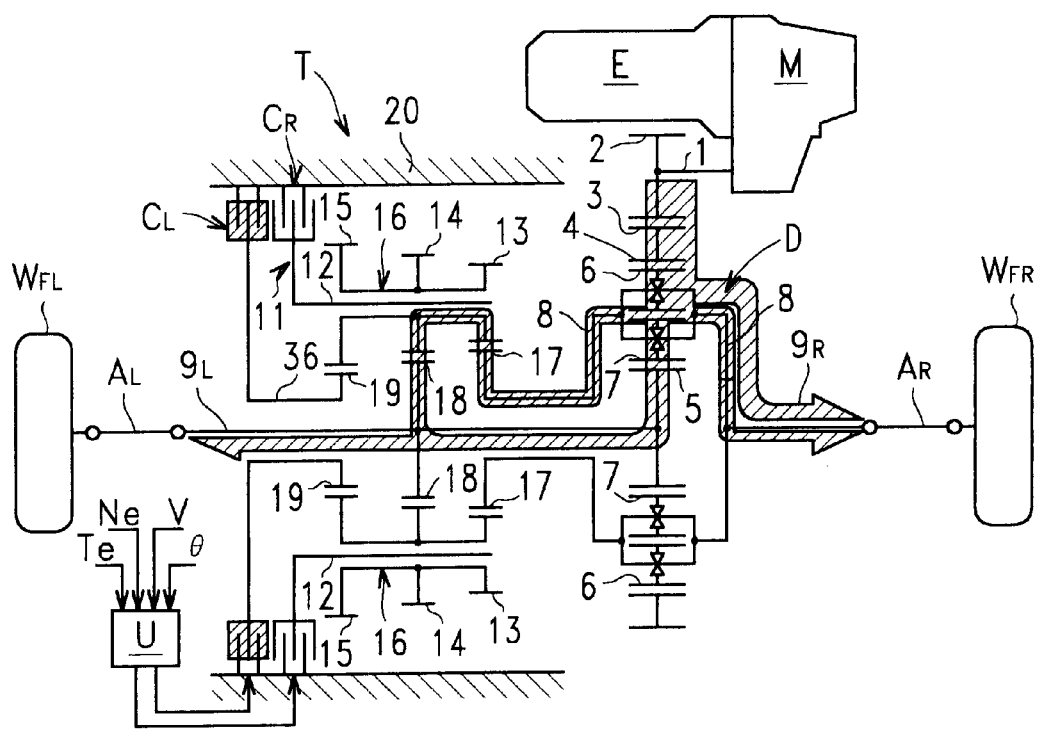
FIG. 4 shows an action at the time of left gyration in a medium-to-low speed range of the driving force distributing device.

On the other hand, in left gyration in the medium-to-low speed range of the vehicle, in response to a command from the electronic control unit, the left clutch $C_L$ is engaged to connect the third pinion 15 to the housing 20 via the third sun gear 19, as shown in FIG. 4. As a result, the number of rotations of the carrier member 11 is increased with respect to the number of rotations of the left output shaft $9_L$ and the number of rotations $N_R$ of the right front wheel $W_{FR}$ is increased in the relation expressed by the following equation (2) with respect to the number of rotations $N_L$ of the left front wheel $W_{FL}$.

$$N_R/N_L = \{1-(Z_5/Z_6) \times (Z_3/Z_1)\} \div \{1-(Z_5/Z_6) \times (Z_4/Z_3)\} \quad (2)$$

As the number of rotations $N_R$ of the right front wheel $W_{FR}$ increases with respect to the number of rotations $N_L$ of the left front wheel $W_{FL}$ as described above, a part of the torque of the left front wheel $W_{FL}$, which is the gyratory inner wheel, can be transmitted to the right front wheel $W_{FR}$, which is the gyratory outer wheel, as indicated by a shaded arrow in FIG. 4. Again, by appropriately adjusting the connecting force of the left electromagnetic clutch $C_L$ and increasing the number of rotations of the carrier member 11, the number of rotations $N_R$ of the right front wheel $W_{FR}$ can be increased with respect to the number of rotations $N_L$ of the left front wheel $W_{FL}$ in accordance with the increase and an arbitrary torque can be transmitted from the left front wheel $W_{FL}$, which is the gyratory inner wheel, to the right front wheel $W_{FR}$, which is the gyratory outer wheel. Therefore, when the vehicle is traveling at a medium-to-low speed, the gyration performance can be improved by transmitting a greater torque to the gyratory outer wheel than the gyratory inner wheel. When the vehicle is traveling at a high speed, the traveling stability performance can be improved by reducing the torque transmitted to the gyratory outer wheel in comparison with the case of traveling at a medium-to-low speed, or by conversely transmitting a torque from the gyratory outer wheel to the gyratory inner wheel.

As is clear from the comparison between the equations (1) and (2), the speed increase rate (approximately 1.143) from the right front wheel $W_{FR}$ to the left front wheel $W_{FL}$ and the speed increase rate (approximately 1.167) from the left front wheel $W_{FL}$ to the right front wheel $W_{FR}$ can be made substantially equal by setting the above-described numbers of cogs for the first pinion 13, the second pinion 14, the third pinion 15, the first sun gear 17, the second sun gear 18 and the third sun gear 19.

The electromagnetic clutch to which the present invention is applied will now be described in detail with reference to the drawings.

Since the left and right electromagnetic clutches $C_L$, $C_R$ have substantially horizontally symmetrical structures with respect to a symmetrical plane P orthogonal to an axial line L of the left and right output shafts $9_L$, $9_R$, the structure of the left electromagnetic clutch $C_L$ will be described hereinafter as a representative. The numerals and symbols given to the constituent elements of the right electromagnetic clutch $C_R$ are the same numerals and symbols of the constituent elements of the left electromagnetic clutch $C_L$ with their subscripts L replaced by R.

First Embodiment

First, a first embodiment of the electromagnetic clutch $C_L$ to which the present invention is applied will be described with reference to FIGS. 5 to 14.

Figure 5:
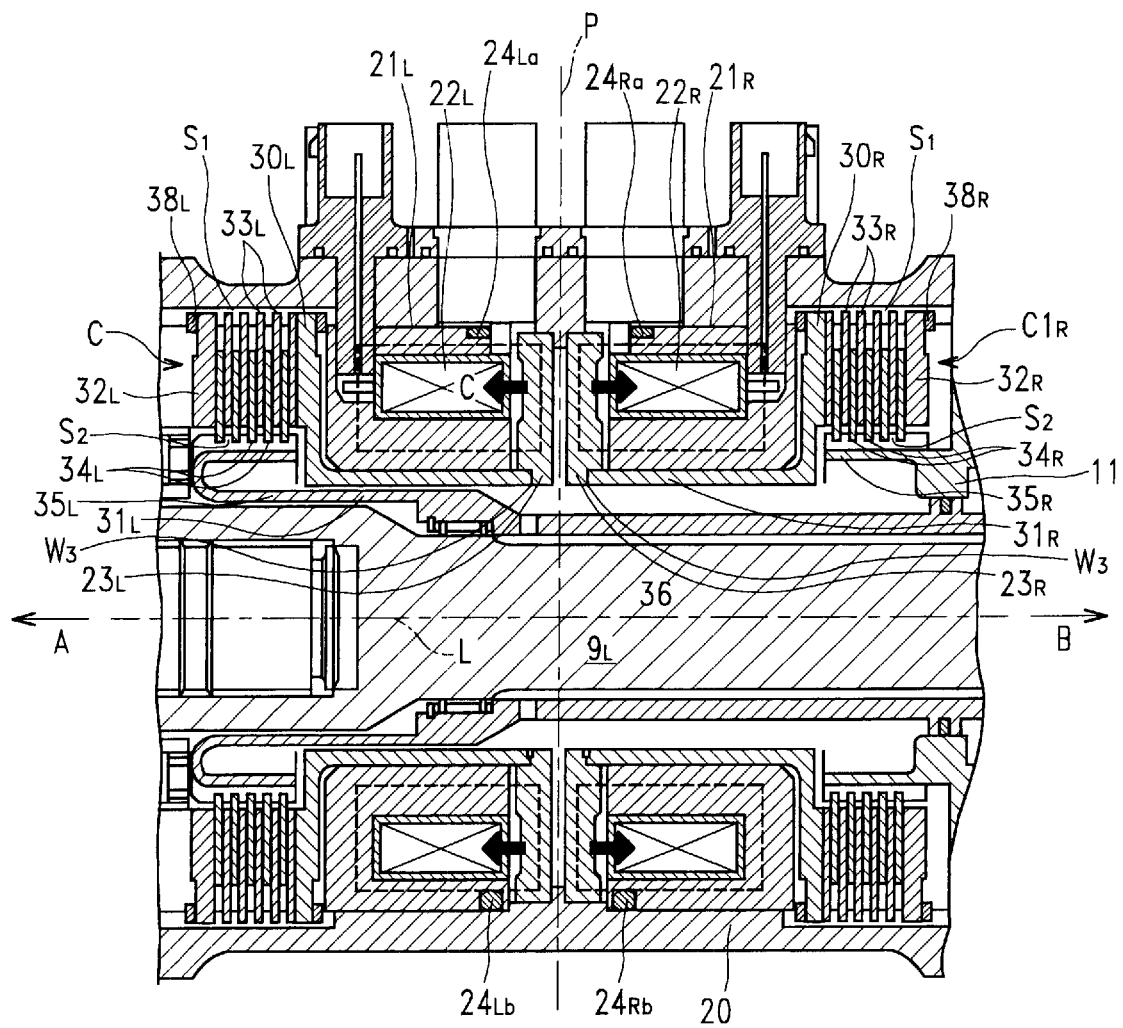
FIG. 5 is an enlarged view showing essential parts of the driving force distributing device.

In the present embodiment, the left front wheel $W_{FL}$ is provided in the direction indicated by an arrow A in FIG. 5 and the right front wheel $W_{FR}$ is provided in the direction indicated by an arrow B. In the following description, the side of the right front wheel $W_{FR}$ is referred to as right side and the side of the left front wheel $W_{FL}$ is referred to as left side.

Figure 6:
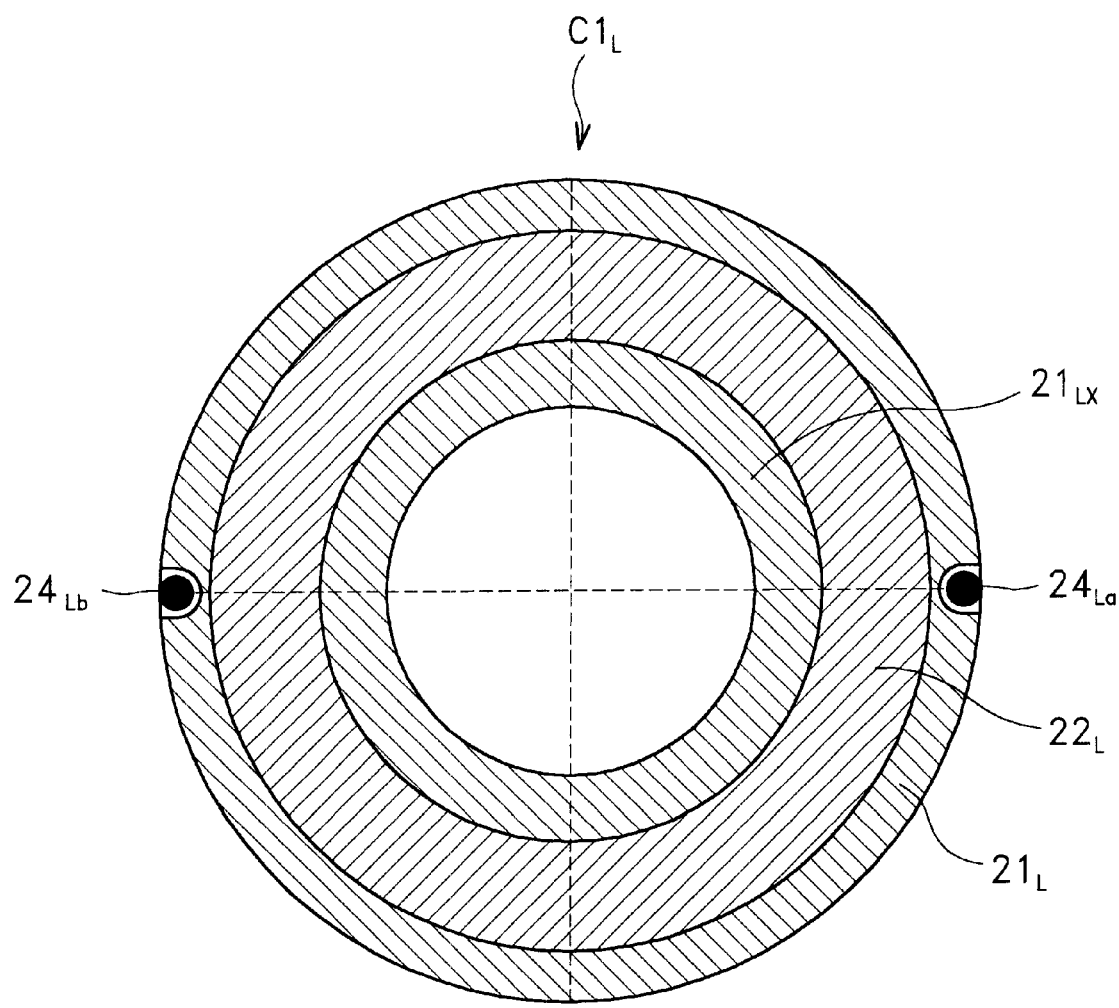
FIG. 6 is a plan view showing a clutch core in the electromagnetic clutch to which the present invention is applied.
Figure 7:
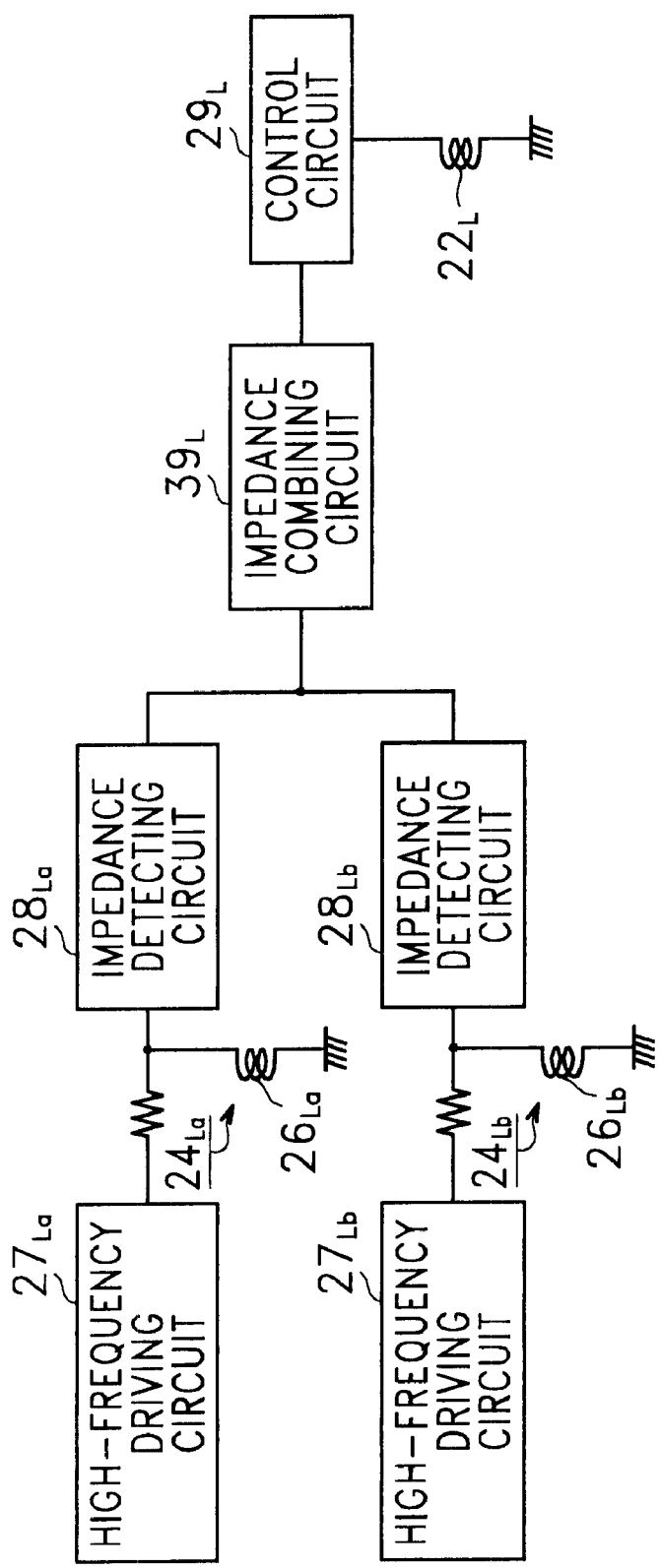
FIG. 7 is a circuit diagram of the electromagnetic clutch.

As shown in FIGS. 5 and 6, an electromagnetic clutch $C_L$ to which the present invention is applied has a clutch core $21_L$, an exciting coil $22_L$, an armature $23_L$, and two sensors $24_{La}$, $24_{Lb}$. The two sensors $24_{La}$, $24_{Lb}$ are connected with high-frequency electrifying circuits $27_{La}$, $27_{Lb}$ and impedance detecting circuits $28_{La}$, $28_{Lb}$, respectively, as shown in FIG. 7. The two impedance detecting circuits $28_{La}$, $28_{Lb}$, are connected with an impedance combining circuit $39_L$. The impedance combining circuit $39_L$ is connected with a current control circuit $29_L$.

The sensors $24_{La}$, $24_{Lb}$ have the same structure. The high-frequency electrifying circuits $27_{La}$, $27_{Lb}$ have the same structure. The impedance detecting circuits $28_{La}$, $28_{Lb}$ have the same structure. Therefore, the sensor $24_{La}$, the high-frequency electrifying circuit $27_{La}$, and the impedance detecting circuit $28_{La}$ will be described as representatives. The numerals given to the constituent elements of the sensor $24_{Lb}$ are the same numerals of the constituent elements of the sensor $24_{La}$ with their subscripts a replaced by b.

The clutch core $21_L$ is made of a magnetic material. The clutch core $21_L$ is cylindrical and has an aperture on its one major surface. On the clutch core $21_L$, a protrusion $21_{LX}$ extending from a substantially central part on the other major surface toward the one major surface is formed. This protrusion $21_{LX}$ is substantially perpendicular to both major surfaces of the clutch core $21_L$. Specifically, the clutch core $21_L$ has such a structure that a ring-shaped groove is formed on the one major surface side. The clutch core $21_L$ is provided on the inner circumferential side of the housing 20, with the aperture arranged on the side of the right front wheel $W_{FR}$. The clutch core $21_L$ is fixed so that the clutch core $21_L$ cannot rotate or horizontally move.

The exciting coil $22_L$ is made of a conductive material and is housed inside the clutch core $21_L$. The exciting coil $22_L$ excites the clutch core $21_L$ by being electrified.

The armature $23_L$ is made of a magnetic material and has a disc shape having a hole substantially at the center. The armature $23_L$ is attracted to the clutch core $21_L$ by a predetermined attracting force in accordance with the current supplied to the exciting coil $22_L$.

The sensor $24_{La}$, magnetically sensitive means, senses the magnetic flux quantity of a magnetic circuit including the clutch core $21_L$ and the armature $23_L$. The sensor $24_{La}$ and the sensor $24_{Lb}$ are provided at an interval of 180 degrees on the outer circumferential surface of the clutch core $21_L$.

Figure 8:
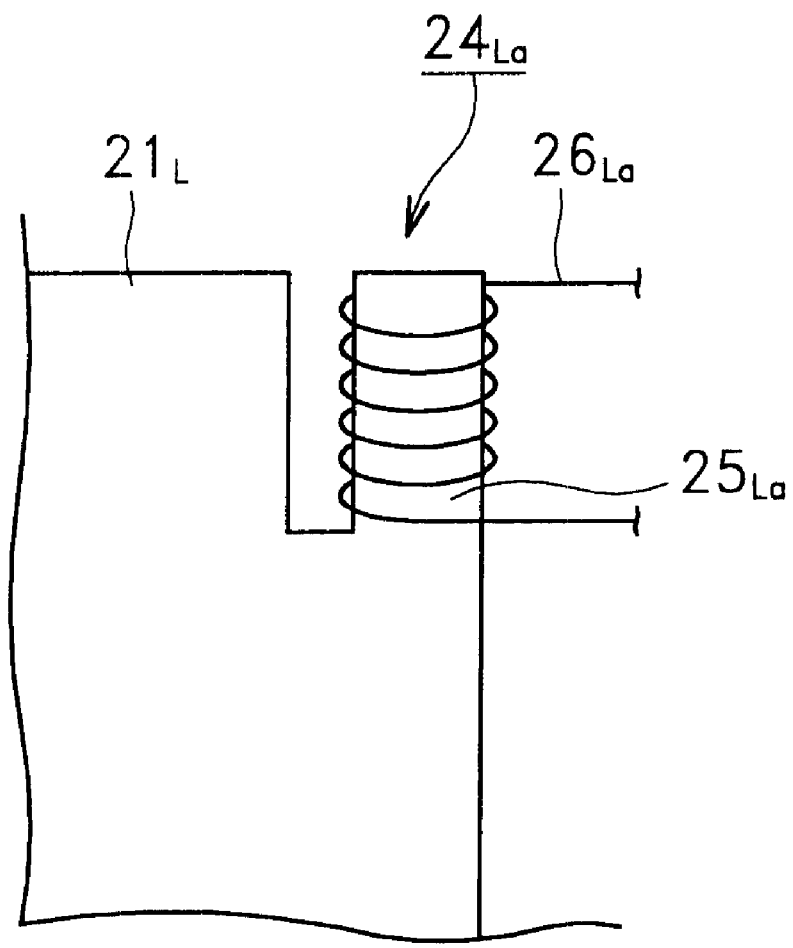
FIG. 8 shows a sensor provided in the electromagnetic clutch.
Figure 9A:
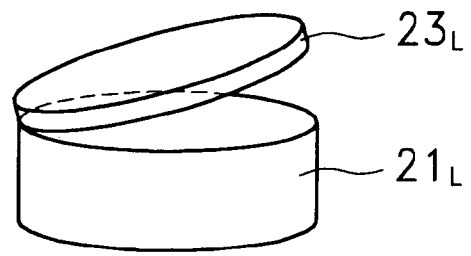
FIGS. 9A to 9D illustrate a method for measuring an output from the sensor in the electromagnetic clutch.
Figure 9B:
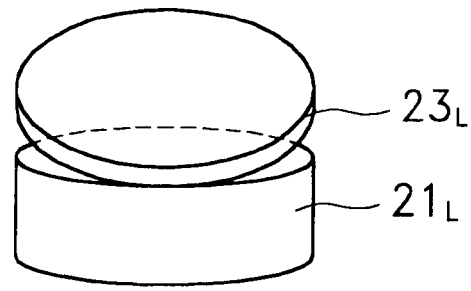
Figure 9C:
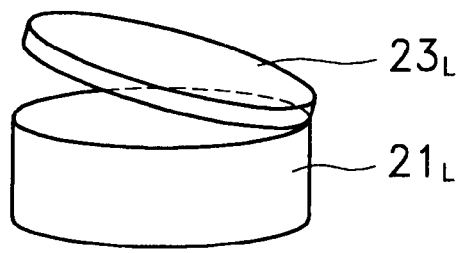
Figure 9D:
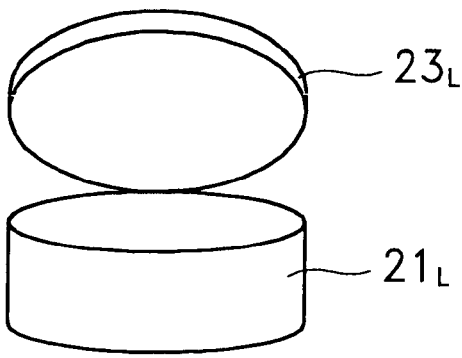

The sensor $24_{La}$ is constituted by winding a sensor coil $26_{La}$ on a sensor core $25_{La}$ formed by the clutch core $21_L$, as shown in FIG. 8. This sensor $24_{La}$ is excited, for example, as a high-frequency pulse current flows through the sensor coil $26_{La}$. When the sensor $24_{La}$ has sensed a magnetic flux, the impedance change of the sensor coil $26_{La}$ increases.

The sensor coil $26_{La}$ is connected with the high-frequency driving circuit $27_{La}$ and the impedance detecting circuit $28_{La}$, as shown in FIG. 7. The magnetic flux in the magnetic circuit including the clutch core $21_L$ and the armature $23_L$ is measured by the sensor $24_L$, the high-frequency driving circuit $27_{La}$ and the impedance detecting circuit $28_{La}$.

The high-frequency driving circuit $27_{La}$ drives the sensor coil $26_{La}$ at a high frequency.

The impedance detecting circuit $28_{La}$ measures the impedance of the sensor coil $26_{La}$ on the basis of an electric signal outputted from the sensor coil $26_{La}$ and supplies the measured impedance to the impedance combining circuit $39_L$.

The impedance combining circuit $39_L$ combines the impedance supplied from the impedance detecting circuits $28_{La}$, $28_{Lb}$ and supplies the result of the combination to the current control circuit $29_L$.

The current control circuit $29_L$ controls the current flowing to the exciting coil $22_L$ on the basis of the result supplied from the impedance combining circuit $39_L$.

In the electromagnetic clutch $C1_L$, the sensor $24_{La}$ is constituted by winding the sensor coil $26_{La}$ on the sensor core $25_{La}$ formed by the clutch core $21_L$. Therefore, when designing the electromagnetic clutch, for example, the attachment part of the sensor need not be taken into account and the sensor can be easily attached to the electromagnetic clutch. Moreover, the sensor $24_{La}$ is robust.

On the major surface of the clutch core $21_L$ which is opposite to the aperture side, a first pressure plate $30_L$ is provided in such a manner that its one major surface faces the major surface of the clutch core $21_L$. From the first pressure plate $30_L$, a transfer member $31_L$ extends along the lateral side of the clutch core $21_L$ and toward the aperture. This transfer member $31_L$ is welded (w) to the armature $23_L$. The first pressure plate $30_L$ is provided to be horizontally movable in accordance with the attraction of the armature $23_L$ to the clutch core $21_L$.

On the other major surface side of the first pressure plate $30_L$, a second pressure plate $32_L$ is provided. The second pressure plate $32_L$ is latched by a stopper ring $38_L$ provided on the inner circumferential side of the housing 20. In this case, a predetermined spacing is provided between the first pressure plate $30_L$ and the second pressure plate $32_L$. The first pressure plate $30_L$ and the second pressure plate $32_L$ are provided in such a manner that their major surfaces are parallel to each other.

Between the first pressure plate $30_L$ and the second pressure plate $32_L$, a plurality of outer discs $33_L$ and a plurality of inner discs $34_L$ are alternately provided via pads. In the present embodiment, five outer discs $33_L$ and five inner discs $34_L$ are provided.

In this case, the inner disc $34_L$ is in contact with the first pressure plate $30_L$ and the outer disc $33_L$ is in contact with the second pressure plate $32_L$. The plurality of inner discs $34_L$ are provided at positions closer to the left output shaft $9_L$ than the positions of the plurality of outer discs $33_L$. The plurality of outer discs $33_L$ are spline-connected (S1) to the clutch core $21_L$, rotatably and movably in the axial direction. The plurality of inner discs $34_L$ are spline-connected (S2) to an inner guide $35_L$, rotatably and movably in the axial direction. The inner guide $35_L$ is provided integrally with a sleeve 36. The sleeve 36 is integrated with the third sun gear 19. The sleeve 36 rotated in accordance with the rotation of the third sun gear 19. The inner discs $34_L$ rotate integrally with the sleeve 36.

Meanwhile, a right electromagnetic clutch $C1_R$ has a structure which is symmetrical to the left electromagnetic clutch $C1_L$ on the symmetrical plane P. While the inner guide $35_L$ is integrated with the sleeve 36, an inner guide $35_R$ of the right electromagnetic clutch $C1_R$ is integrated with the carrier member 11.

In this electromagnetic clutch $C1_L$, as a current flows through the exciting coil $22_L$ in accordance with a command from the electronic control unit U, a magnetic flux is formed along the closed magnetic circuit including the clutch core $21_L$ and the armature $23_L$, as indicated by a broken line in FIG. 5, and the armature $23_L$ is attracted to the clutch core $21_L$ as indicated by an arrow C. Then, the transfer member $31_L$ connected to the armature $23_L$ moves and presses the first pressure plate $30_L$ toward the second pressure plate $32_L$. In this case, the outer discs $33_L$ and the inner discs $34_L$ are pressed between the first pressure plate $30_L$ and the second pressure plate $32_L$, and the first pressure plate $30_L$ approaches closely to the second pressure plate $32_L$. The rotation of the inner discs $34_L$ stops at this point.

In this case, the sensor coil $26_{La}$ is driven at a high frequency by the high-frequency driving circuit $27_{La}$. As the sensor $24_{La}$ senses the magnetic flux in the magnetic circuit, the impedance of the sensor coil $26_{La}$ changes and an electric signal outputted from the sensor coil $26_{La}$ changes. Then, on the basis of the electric signal outputted from the sensor coil $26_{La}$, the impedance is detected by the impedance detecting circuit $28_{La}$. The detected impedance is supplied to the impedance combining circuit $39_L$. The impedance combining circuit $39_L$ combines the impedance supplied from the impedance detecting circuits $28_{La}$, $28_{Lb}$ and outputs the combined impedance to the current control circuit $29_L$. The current control circuit $29_L$ controls the current supplied to the exciting coil $22_L$ on the basis of the signal supplied from the impedance combining circuit $39_L$.

The impedance may be combined in various ways: electric signals outputted from the sensor coils $26_{La}$, $26_{Lb}$ may be averaged; an average may be obtained after discarding the electric signals that deviate from a simple average by a given amount or more; or the electric signals outputted from sensor coils $26_{La}$, $26_{Lb}$ may be added. Specifically, electric signals outputted from the sensor coils $26_{La}$, $26_{Lb}$ may be added or averaged on an analog circuit using an operational amplifier, or electric signals outputted from the sensor coils $26_{La}$, $26_{Lb}$ may be A/D-converted and supplied to a microcomputer so that these signals are added or averaged using software.

To detect the impedance of the sensor coil $26_{La}$ that varies with the magnetic flux quantity of the magnetic circuit, an eddy current may be used. An eddy current is generated when the conductor is put in a varying magnetic field and circulates through a conductor.

The method for detecting the magnetic flux generated in the magnetic circuit using an eddy current generated in the sensor core $25_{La}$ will now be described.

To generate an eddy current in the sensor core $25_{La}$, the sensor core $25_{La}$ must be conductive. Therefore, when using an eddy current, the clutch core $21_L$ must be made of a conductive material.

First, the sensor coil $26_{La}$ is driven at a high frequency by the high-frequency driving circuit $27_L$ in such a manner that the magnetic flux in the sensor core $25_{La}$ is not saturated. In the following description, the phenomenon of saturation of the magnetic flux in the sensor core $25_{La}$ is referred to as magnetic flux saturation.

When the sensor coil $26_{La}$ is driven at a high frequency, an eddy current is generated in the sensor core $25_{La}$ since the sensor core $25_{La}$ itself is conductive. The impedance of the sensor coil $26_{La}$ contains an impedance change caused by the eddy current with a phase difference of 180 degrees from the driving wave in addition to an impedance change caused by self-induction with a phase difference of 90 degrees from the driving wave. The values of these two changes vary with the permeability $\mu$ of the sensor core material. If the sensor core $25_{La}$ is excited in such a manner that the sensor core $25_{La}$ is not saturated, the eddy current change greatly conditions the impedance of the sensor coil $26_{La}$. The impedance resulting from the combination of these two changes varies greatly with respect to the change in quantity of the magnetic flux generated in the sensor core $25_{La}$.

Alternatively, the impedance of the sensor coil $26_{La}$ in accordance with the magnetic flux quantity of the magnetic circuit may be detected by a method in which the sensor $24_{La}$ is a so-called saturable sensor. In this case, the sensor coil $26_{La}$ is driven in such a manner that magnetic flux saturation of the sensor core $25_{La}$ occurs when the magnetic flux is generated in the clutch core $21_{La}$ The magnetic flux saturation of the sensor core $25_{La}$ affects the magnetic flux of the magnetic circuit. For example, the magnetic flux quantity of the magnetic circuit changes. As the magnetic flux of the magnetic circuit is affected, the attracting force of the armature $23_L$ to the clutch core $21_L$ is affected, too. That is, the connecting force of the electromagnetic clutch $C1_L$ is affected. Therefore, in the electromagnetic clutch $C1_L$, it is preferred to detect the magnetic flux quantity generated in the magnetic circuit by using the eddy current.

By measuring the magnetic flux quantity using the eddy current and measuring the magnetic flux quantity using the saturable sensor, in the electromagnetic clutch $C1_L$, it is possible to measure the magnetic flux quantity in the magnetic circuit, that is, the magnetic flux quantity of a static magnetic field in the magnetic circuit. Therefore, in the electromagnetic clutch $C1_L$, the magnetic flux quantity in the magnetic circuit can be measured even when the magnetic flux quantity does not change.

The relation between the inclination of the armature $23_L$ and the result of the combination of electric signals outputted from the sensors $24_{La}$, $24_{Lb}$, was examined. The electric signal outputted from the sensor $24_{La}$ represents the electric signal outputted from the sensor coil $26_{La}$ and the electric signal outputted from the sensor $24_{Lb}$ represents the electric signal outputted from the sensor coil $26_{Lb}$.

Figure 10:
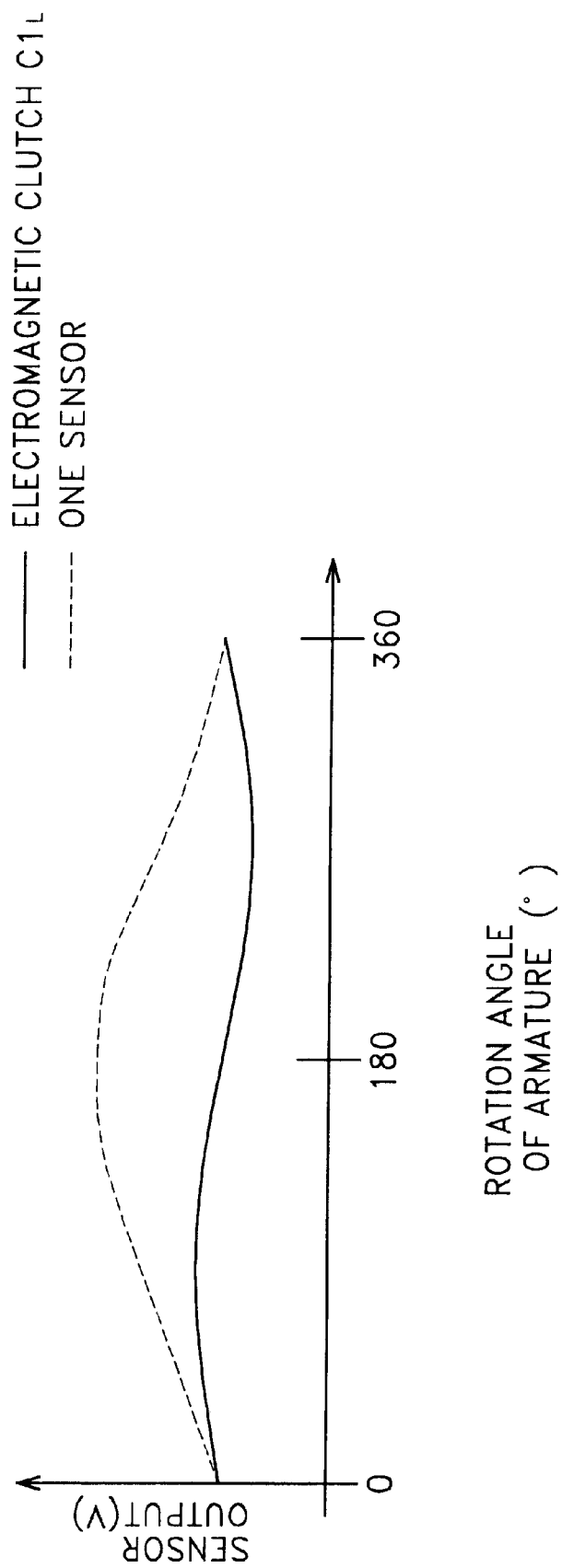
FIG. 10 shows the comparison between an output from the sensor in the electromagnetic clutch and an output from a sensor in an electromagnetic clutch having one sensor on its lateral side.

Specifically, one point of the armature $23_L$ was placed in contact with the clutch core $21_L$, as shown in FIGS. 9A to 9D. Then, the armature $23_L$ was rotated so that the point in contact moved 360 degrees, and an electric signal outputted from the impedance combining circuit $39_L$ was measured. In the present embodiment, the impedance combining circuit $39_L$ combines the outputs from the sensors $24_{La}$, $24_{Lb}$, on an analog circuit using an operational amplifier. The result is shown in FIG. 10. The relation between the inclination of the armature and the electric signal outputted from the sensor was also examined with respect to an electromagnetic clutch having one sensor.

From FIG. 10, it is understood that the change of the electric signal due to the inclination of the armature $23_L$ in the electromagnetic clutch $C1_L$ having the two sensors $24_{La}$, $24_{Lb}$ is not more than half the change of the electric signal in the electromagnetic clutch having one sensor. That is, in the electromagnetic clutch $C1_L$, the attracting force can be accurately controlled even when the armature $23_L$ is inclined with respect to the clutch core $21_L$.

As is described above, in the electromagnetic clutch $C1_L$ to which the present invention is applied, the magnetic flux quantity of the magnetic circuit can be accurately measured even when the magnetic flux does not vary. With the two sensors $24_{La}$, $24_{Lb}$ provided, the impedance corresponding to the magnetic flux quantity can be measured at two positions in the magnetic circuit including the clutch core $21_L$ and the armature $23_L$. Moreover, the current control circuit $29_L$ controls the current supplied to the exciting coil $22_L$ on the basis of the result of combination of the impedance measured at the two positions.

Therefore, in the electromagnetic clutch $C1_L$, the attracting force of the armature $23_L$ to the clutch core $21_L$ can be accurately measured even when the armature $23_L$ is inclined with respect to the clutch core $21_L$ and is attracted thereto in the inclined state. That is, in the electromagnetic clutch $C1_L$, the connecting force can be accurately controlled even when the armature $23_L$ is inclined with respect to the clutch core $21_L$ and is attracted thereto in the inclined state.

Although the number of the sensors $24_L$ provided on the clutch core $21_L$ is two in the present embodiment, the accuracy with which to control the inclination of the armature $23_L$ with respect to the clutch core $21_L$ increases with the number of the sensors $24_L$ provided on the clutch core $21_L$. In this case, the sensors $24_L$ are provided so that a straight line connecting one sensor to another sensor $24_L$ is not parallel to the direction of the magnetic flux passing through the clutch core.

Figure 11:
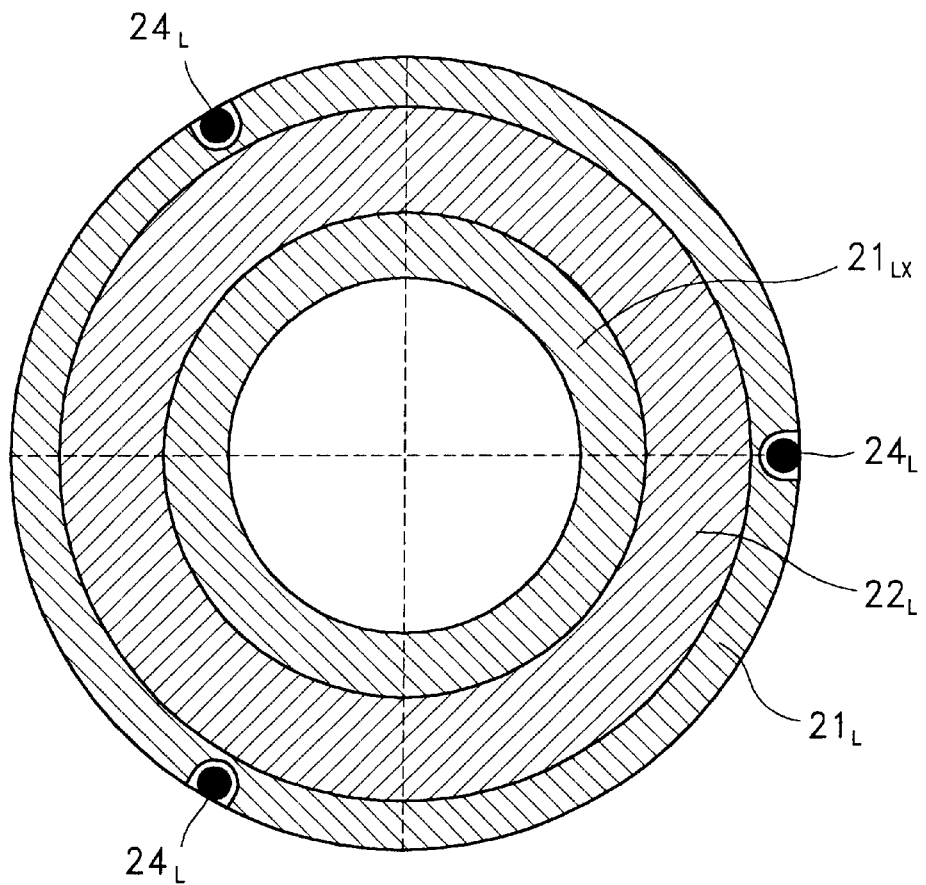
FIG. 11 is a plan view showing a clutch core having three sensors.

The minimum number of sensors $24_L$ on the core to accurately control the inclination of the armature $23_L$ with respect to the clutch core $21_L$ is three, as shown in FIG. 11. In this case, the sensors $24_L$ should most preferably be provided equally spaced from each other by 120 degrees.

Figure 12:
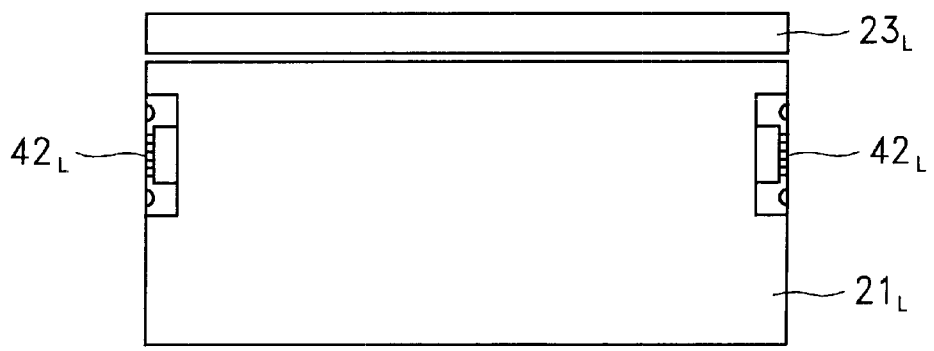
FIG. 12 is a side view showing an electromagnetic clutch in which a sensor is prepared as a separate member from a clutch core and is attached to the clutch core.

The electromagnetic clutch $C1_L$ may also have a structure in which a plurality of sensors $42_L$, each being constituted by winding a sensor coil $41_L$ on a sensor core $40_L$, are provided as separate bodies from the clutch core $21_L$ and then attached to the clutch core $21_L$, as shown in FIG. 12. In this case, it is preferred that the sensors $42_L$ are attached to the lateral side of the clutch core $21_L$ so that the magnetic flux in the clutch core $21_L$ efficiently flows to the sensor cores $41_L$.

Figure 13:
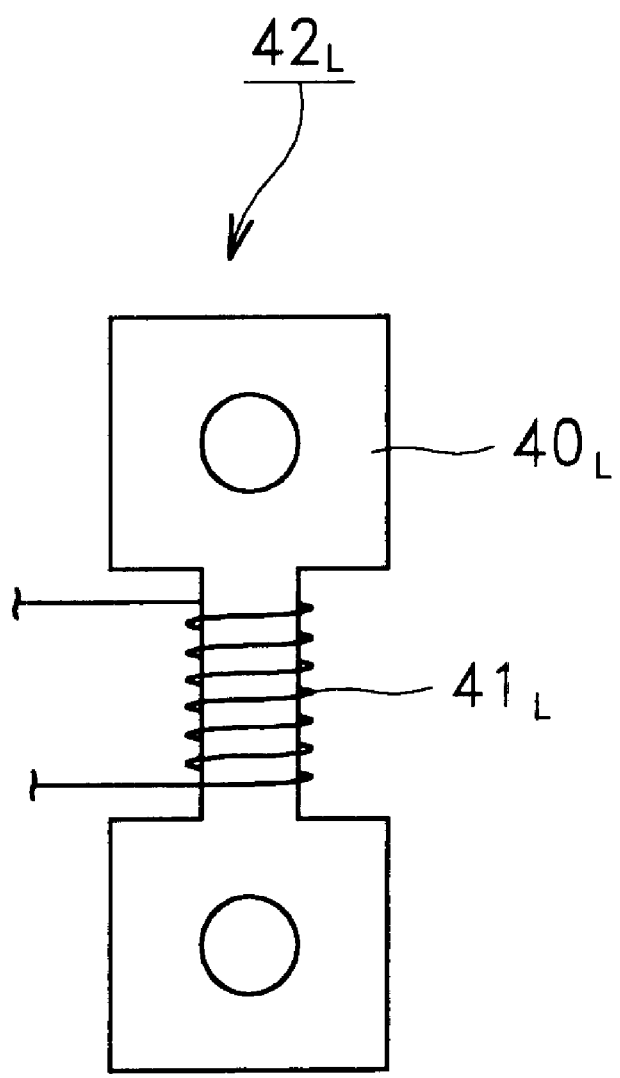
FIG. 13 shows an example of the sensor attached to the electromagnetic clutch.

As the sensor $42_L$, for example, a sensor constituted by winding the sensor coil $41_L$ on a substantially central part of the sensor core $40_L$ as shown in FIG. 13 is used. Although any magnetic material may be used for the sensor core $40_L$, it is preferred that the sensor core $40_L$ is made of the same material as that of the clutch core $21_L$. To increase the quantity of the magnetic flux flowing to the sensor core $40_L$, it is preferable that the sensor core $40_L$ is made of a material having a higher permeability and smaller hysteresis than the material of the clutch core $21_L$. The material having a higher permeability and smaller hysteresis is exemplified by permalloy or an amorphous material containing Fe, Co, Si or B.

Figure 14:
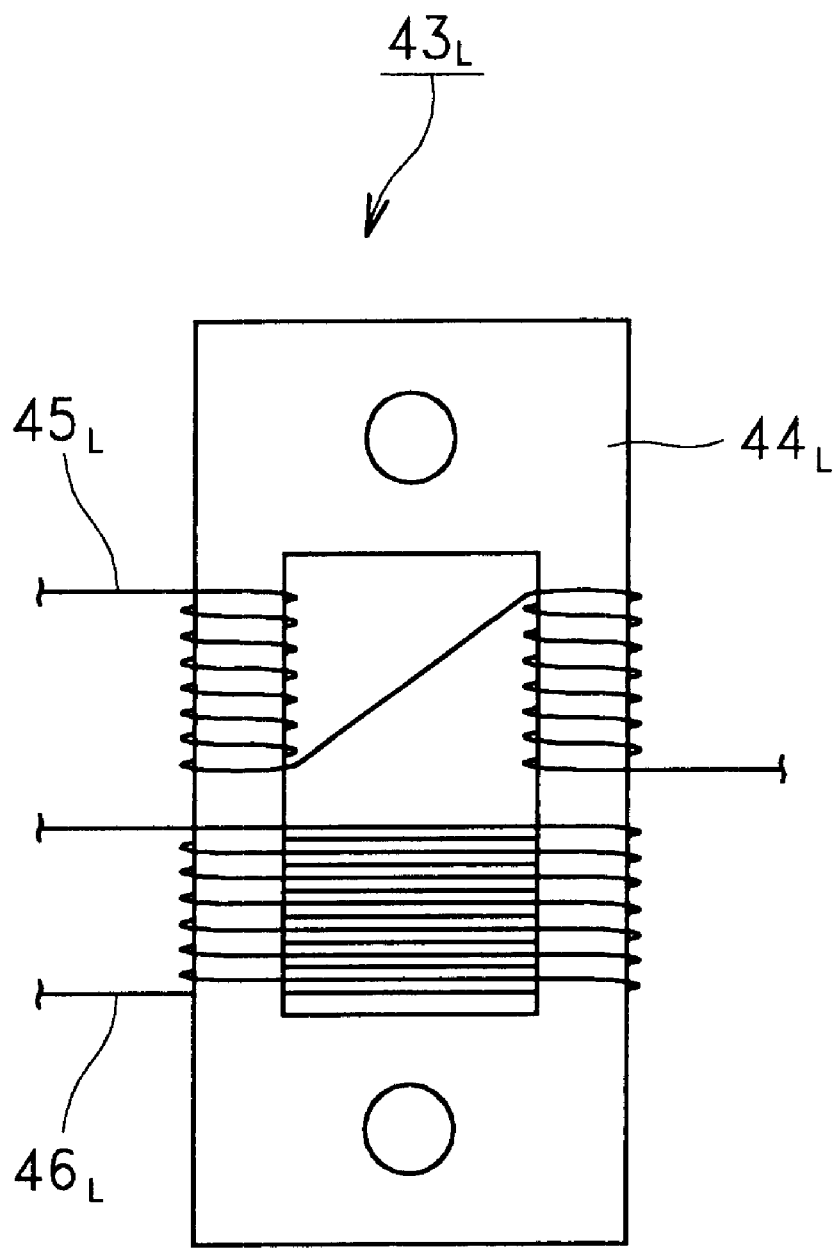
FIG. 14 shows another example of the sensor attached to the electromagnetic clutch.

In place of the sensor $42_L$, a saturable sensor $43_L$ as shown in FIG. 14 may be attached to the clutch core $21_L$. The saturable sensor $43_L$ has a structure in which a first coil $45_L$ for exciting a sensor core $44_L$ and a second coil $46_L$ for detecting the impedance are wound on two facing sides in the longitudinal direction of the sensor core $44_L$, which is rectangular ring-shaped. The first coil $45_L$ is wound on one of the two facing sides and is then continuously wound on the other side. The second coil $46_L$ is wound once on both of the two facing sides. In this case, since the sensor core $44_L$ is ring-shaped and only the sensor core $44_L$ is saturated by the exciting coil $45_L$, the influence on the magnetic flux of the magnetic circuit is reduced even when the sensor core $44_L$ is saturable.

Figure 15:
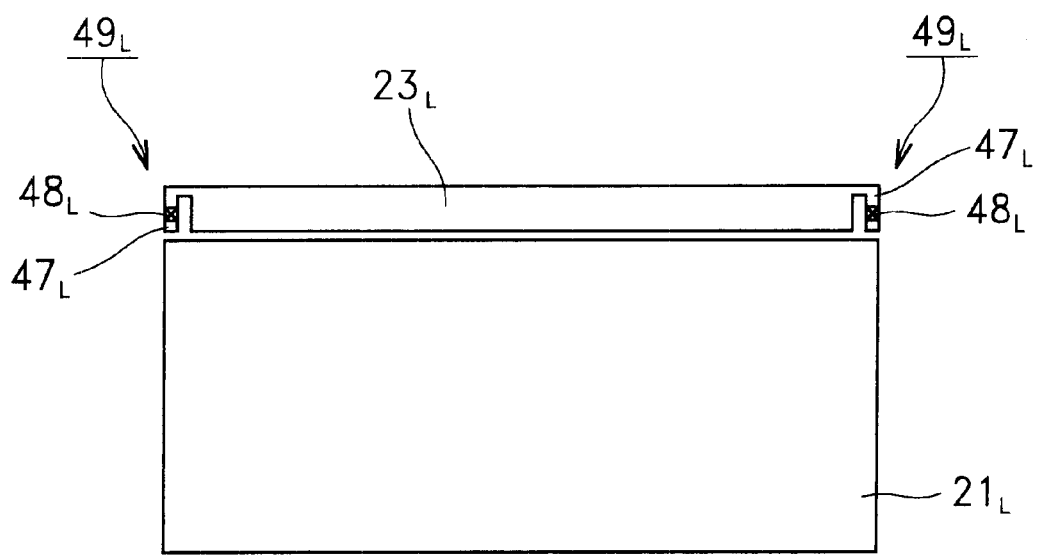
FIG. 15 is a side view showing an electromagnetic clutch in which a plurality of sensor cores and an armature are integrally formed and in which a sensor coil is wound on each sensor core.

Alternatively, in the electromagnetic clutch $C1_L$ to which the present invention is applied, a sensor $49_L$ may be provided on the armature $23_L$ by forming a sensor core $47_L$ using the armature $23_L$ and then winding a sensor coil $48_L$ on the sensor core $47_L$, as shown in FIG. 15.

Figure 16:
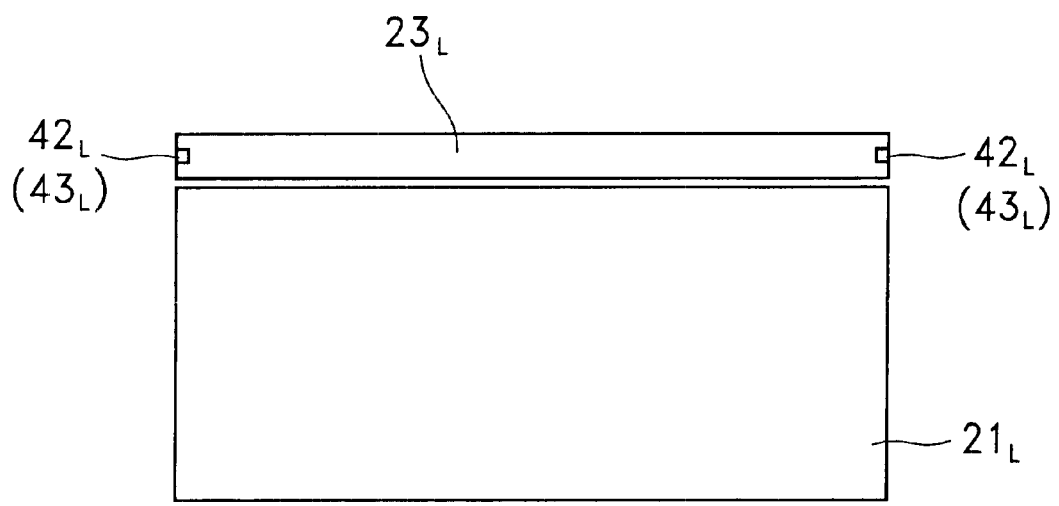
FIG. 16 is a side view showing an electromagnetic clutch in which a plurality of sensors are provided as separate members from a clutch core or an armature and are attached to the armature.

Moreover, in the electromagnetic clutch $C1_L$ to which the present invention is applied, the sensor $42_L$ or the saturable sensor $43_L$ may be attached to the armature $23_L$, as shown in FIG. 16.

Figure 17:
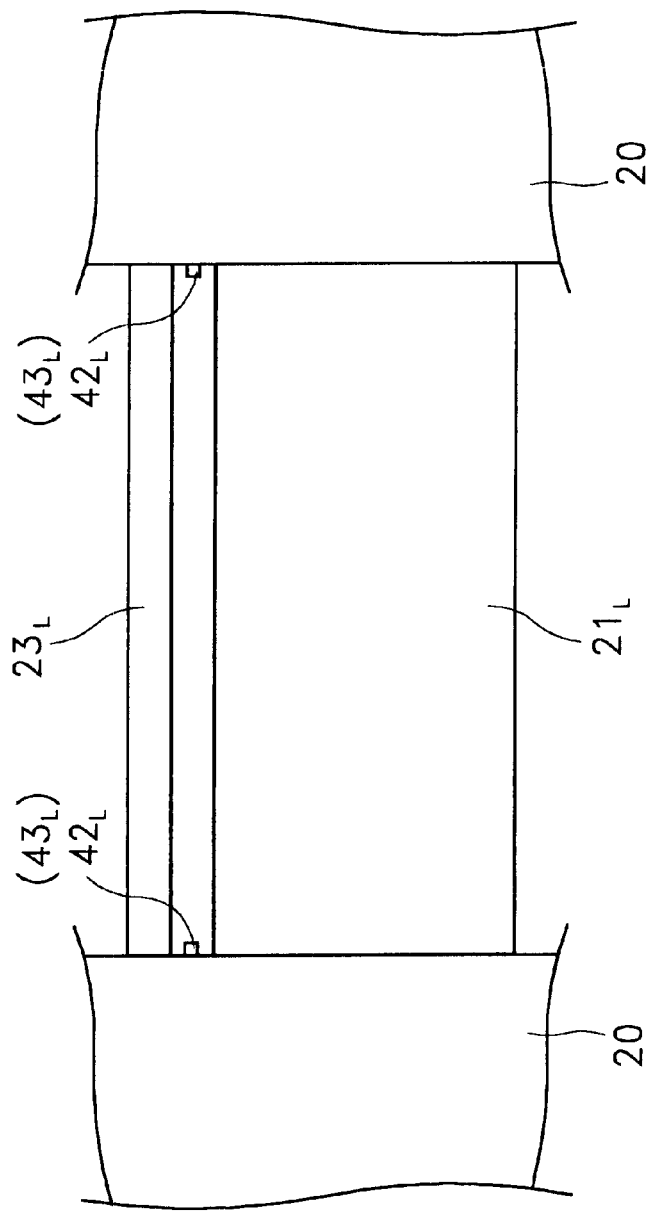
FIG. 17 is a side view showing an electromagnetic clutch in which a plurality of sensors are provided as separate members from a clutch core or an armature and in which each sensor is attached to a housing so as to be arranged between the armature and the clutch core.

Furthermore, in the electromagnetic clutch $C1_L$ to which the present invention is applied, the sensor $42_L$ or the saturable sensor $43_L$ may be provided in the gap between the clutch core $21_L$ and the armature $23_L$, as shown in FIG. 17. In this case, for example, the sensor $42_L$ or the saturable sensor $43_L$ is attached to the housing 20 so as to be arranged in the gap between the clutch core $21_L$ and the armature $23_L$.

Second Embodiment

A second embodiment of the electromagnetic clutch $C_L$ to which the present invention is applied will now be described with reference to FIGS. 18 to 21.

Figure 18:
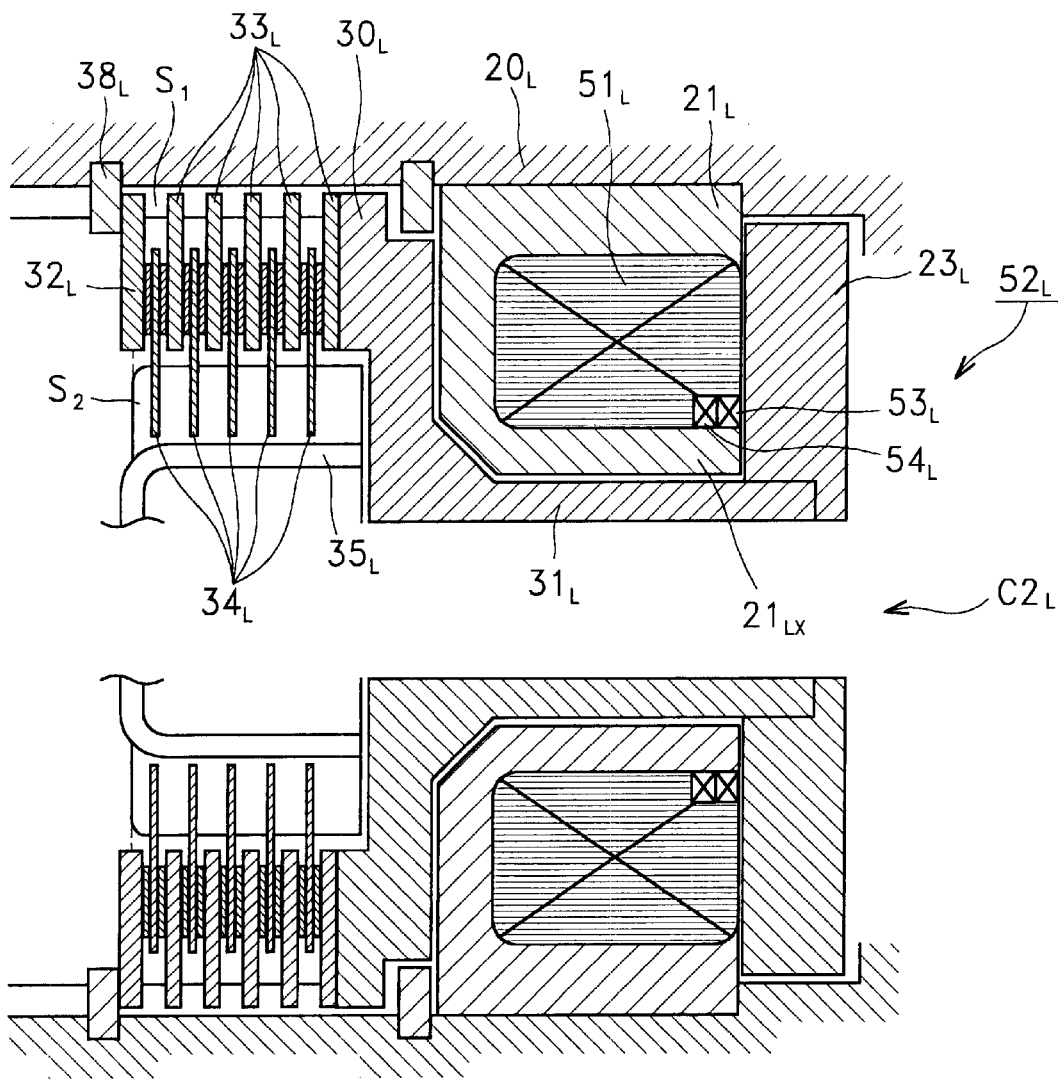
FIG. 18 is a side view showing another electromagnetic clutch to which the present invention is applied and in which a sensor is provided on the entire circumference in the circumferential direction.

As shown in FIG. 18, the present embodiment is similar to the first embodiment except for the positions where an exciting coil $51_L$ and a sensor $52_L$ are provided. Therefore, the detailed description of the first embodiment is used here except for the exciting coil $51_L$ and the sensor $52_L$.

Figure 19:
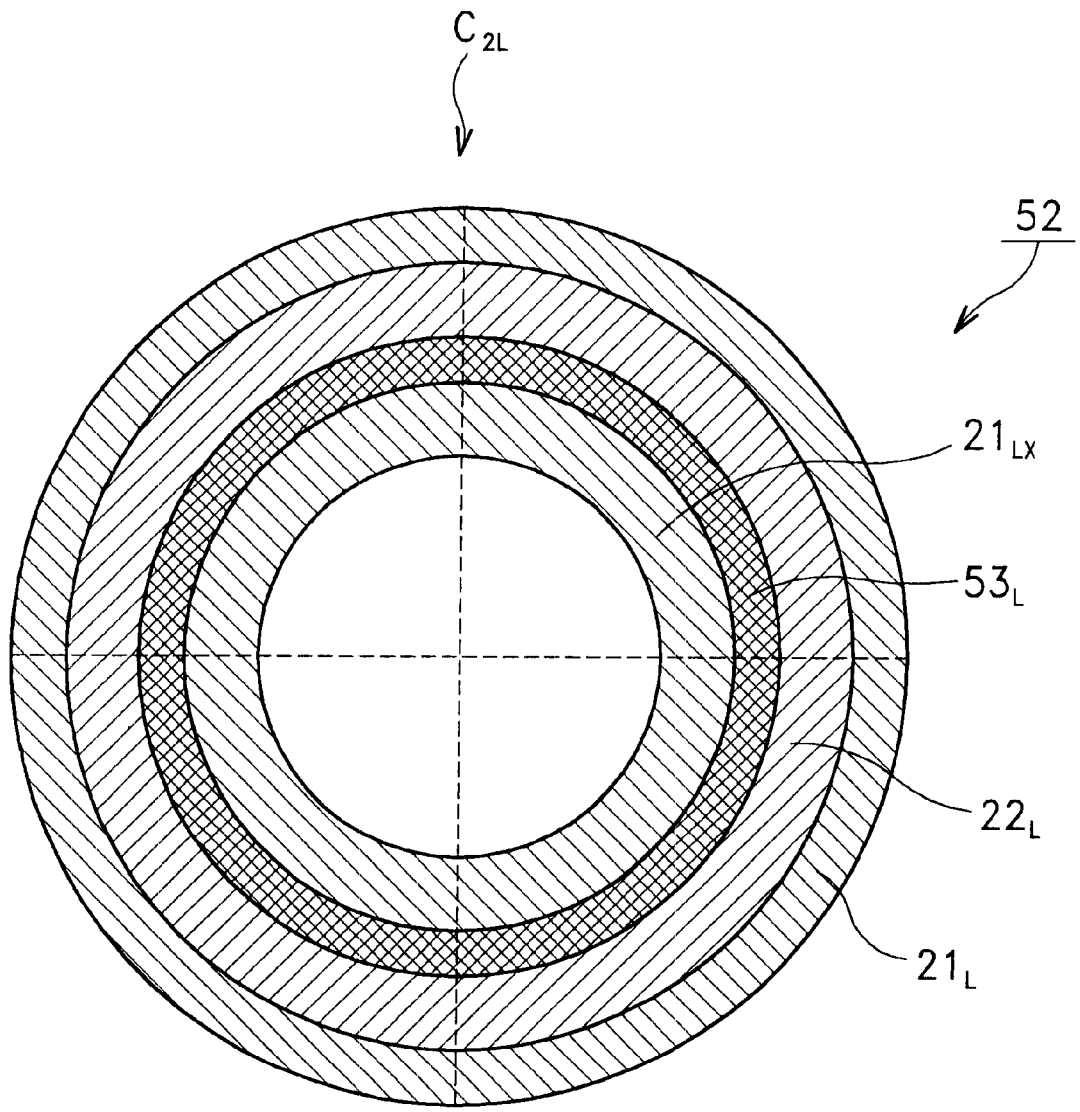
FIG. 19 is a plan view showing a clutch core of the electromagnetic clutch.

An electromagnetic clutch $C2_L$ is constituted by continuously winding sensor coils $53_L$, $54_L$ to form opposite spirals on the protrusion $21_{LX}$ formed on the clutch core $21_L$ and further winding the exciting coil $51_L$ on the outer circumferential side of the sensor coils $53_L$, $54_L$, as shown in FIGS. 18 and 19. Therefore, in the electromagnetic clutch $C2_L$, the protrusion $21_{LX}$ is caused to be the sensor core, and the protrusion $21_{LX}$ and the sensor coils $53_L$, $54_L$ constitute the sensor $52_L$. The sensor $52_L$ is provided substantially at the center of the clutch core $21_L$ in a ring shape concentric with the clutch core $21_L$.

Figure 20:
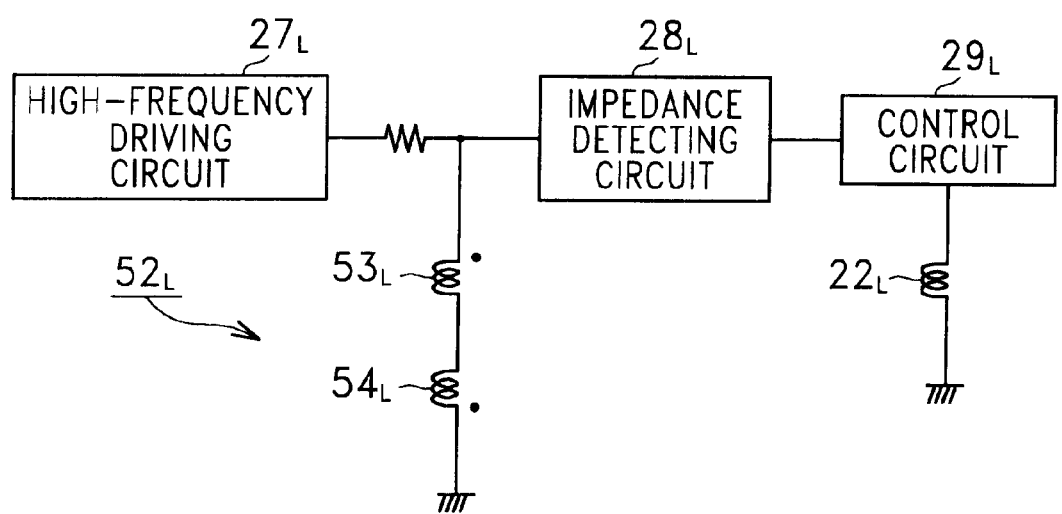
FIG. 20 is a circuit diagram of the electromagnetic clutch.

The sensor coils $53_L$, $54_L$ are connected with the high-frequency driving circuit $27_L$, the impedance detecting circuit $28_L$, and the current control circuit $29_L$, as shown in FIG. 20.

As a high-frequency pulse current flows through the sensor coils $53_L$, $54_L$, the sensor $52_L$ is excited. When the sensor $52_L$ senses a magnetic flux, the impedance change of the sensor coils $53_L$, $54_L$ increases.

The reason for winding the sensor coils $53_L$, $54_L$ to form opposite spirals will now be explained.

When a sensor coil and an exciting coil are close to each other in an electromagnetic clutch, a magnetic field generated from the exciting coil affects the sensor coil. A back electromotive force is generated in the sensor coil. Therefore, an electric signal outputted from the sensor coil is affected.

In the present embodiment, however, the two sensor coils $53_L$, $54_L$ are wound to form opposite spirals. In this case, since back electromotive forces opposite to each other are generated in one sensor coil $53_L$ and the other sensor coil $54_L$, respectively, the back electromotive forces generated in the sensor coils $53_L$, $54_L$ are offset.

Therefore, in the electromagnetic clutch $C2_L$, the influence of the exciting coil $51_L$ on the electric signals outputted from the sensor coils $53_L$, $54_L$ is eliminated by winding the two sensor coils $53_L$, $54_L$ to form opposite spirals on the protrusion $21_{LX}$ and the magnetic flux quantity of the magnetic circuit can be accurately measured.

With respect to the electromagnetic clutch $C2_L$, the relation between the inclination of the armature $23_L$ and the electric signal outputted from the sensor $52_L$ was examined. The electric signal outputted from the sensor $52_L$ represents the electric signals outputted from the two sensor coils $53_L$, $54_L$.

Specifically, one point $23_{La}$ of the armature $23_L$ was placed in contact with the clutch core $21_L$ as shown in FIGS. 9A to 9D. Then, the armature $23_L$ was rotated so that the point in contact moved 360 degrees, and an electric signal outputted from the sensor $52_L$ was measured. In this case, the relation between the inclination of the armature $23_L$ and the electric signal outputted from the sensor $52_L$ was also examined with respect to an electromagnetic clutch having one sensor 24. The result is shown in FIG. 21.

Figure 21:
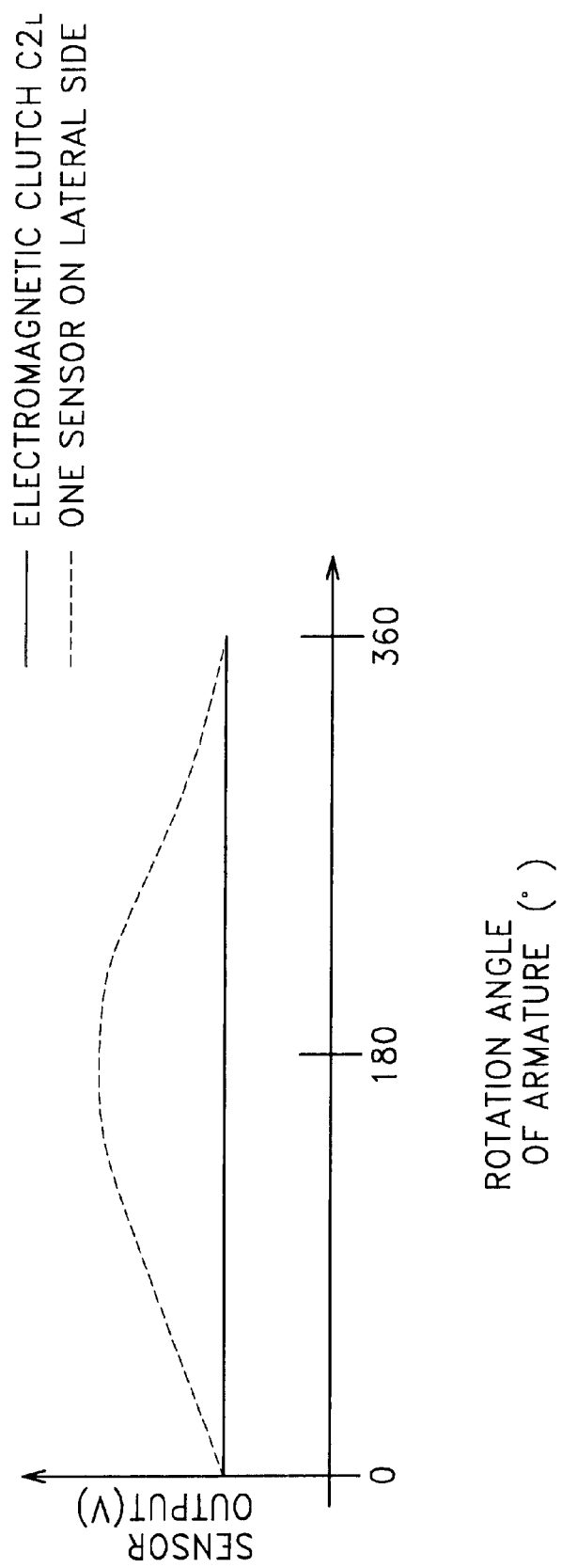
FIG. 21 shows the comparison between an output from a sensor in the electromagnetic clutch and an output from a sensor in an electromagnetic clutch having one sensor on its lateral side.

From FIG. 21, it is understood that in the electromagnetic clutch $C2_L$, the change of the electric signal outputted from the sensor $52_L$ is constant irrespective of the inclination of the armature $23_L$. That is, in the electromagnetic clutch $C2_L$, the attracting force can be accurately controlled even when the armature $23_L$ is inclined with respect to the clutch core $21_L$.

As is described above, in the electromagnetic clutch $C2_L$, the sensor $52_L$ is provided on the entire circumference in the circumferential direction of the clutch core $21_L$. That is, the impedance detecting circuit $28_L$ can measure the impedance corresponding to the quantity of a magnetic flux passing through a predetermined area including the center of the one major surface. The current control circuit $29_L$ controls the current supplied to the exciting coil $51_L$ on the basis of the impedance.

Therefore, in the electromagnetic clutch $C2_L$, the attracting force of the armature $23_L$ to the clutch core $21_L$ can be accurately measured even when the armature $23_L$ is inclined with respect to the clutch core $21_L$ and is attracted thereto in the inclined state. That is, in the electromagnetic clutch $C2_L$, the connecting force can be accurately controlled even when the armature $23_L$ is inclined with respect to the clutch core $21_L$ and is attracted thereto in the inclined state.

Third Embodiment

A third embodiment of the electromagnetic clutch $C_L$ to which the present invention will now be described with reference to FIGS. 22 to 28.

Figure 22:
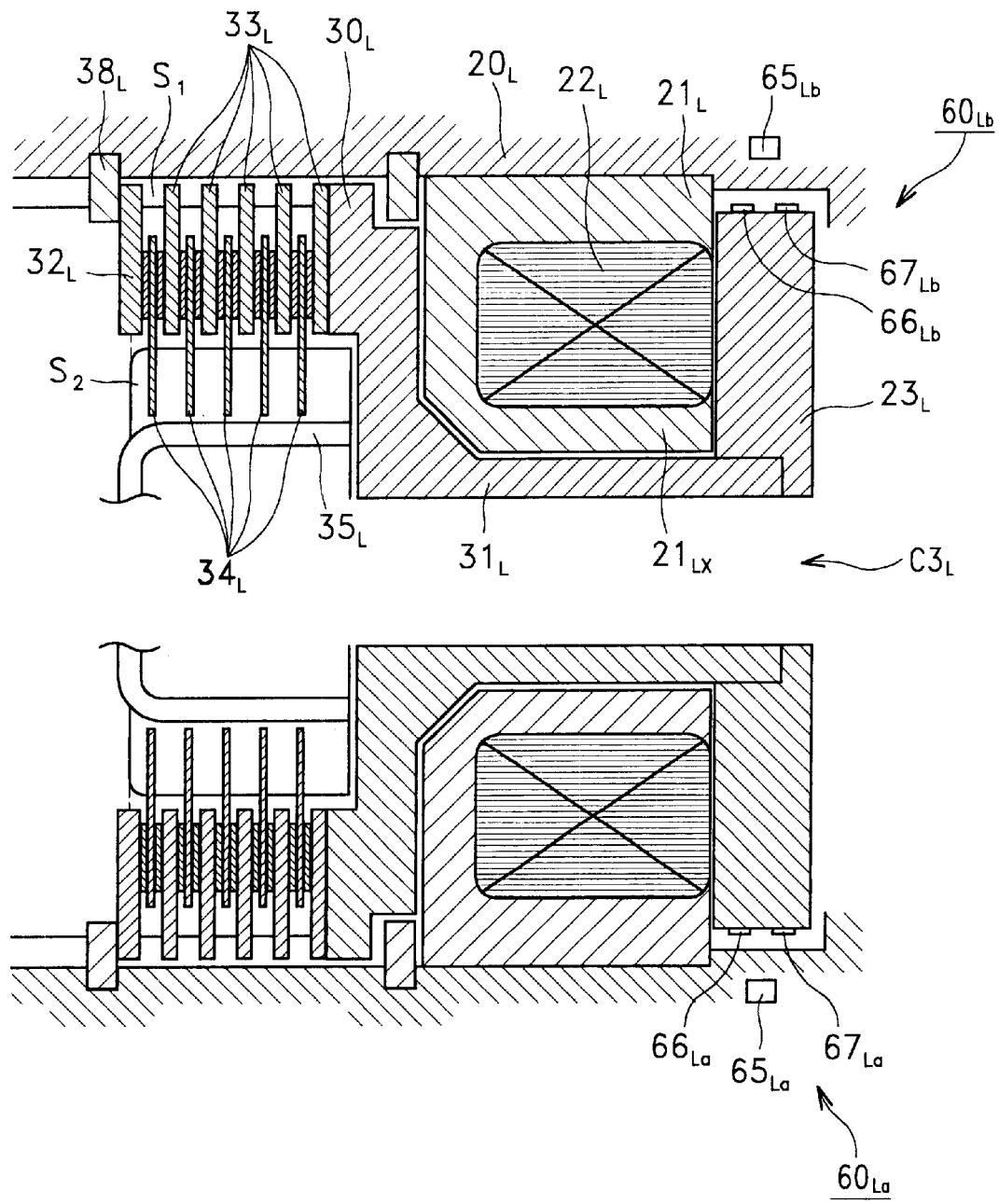
FIG. 22 is a side view showing still another electromagnetic clutch to which the present invention is applied and in which a plurality of position detecting devices are provided.
Figure 23:
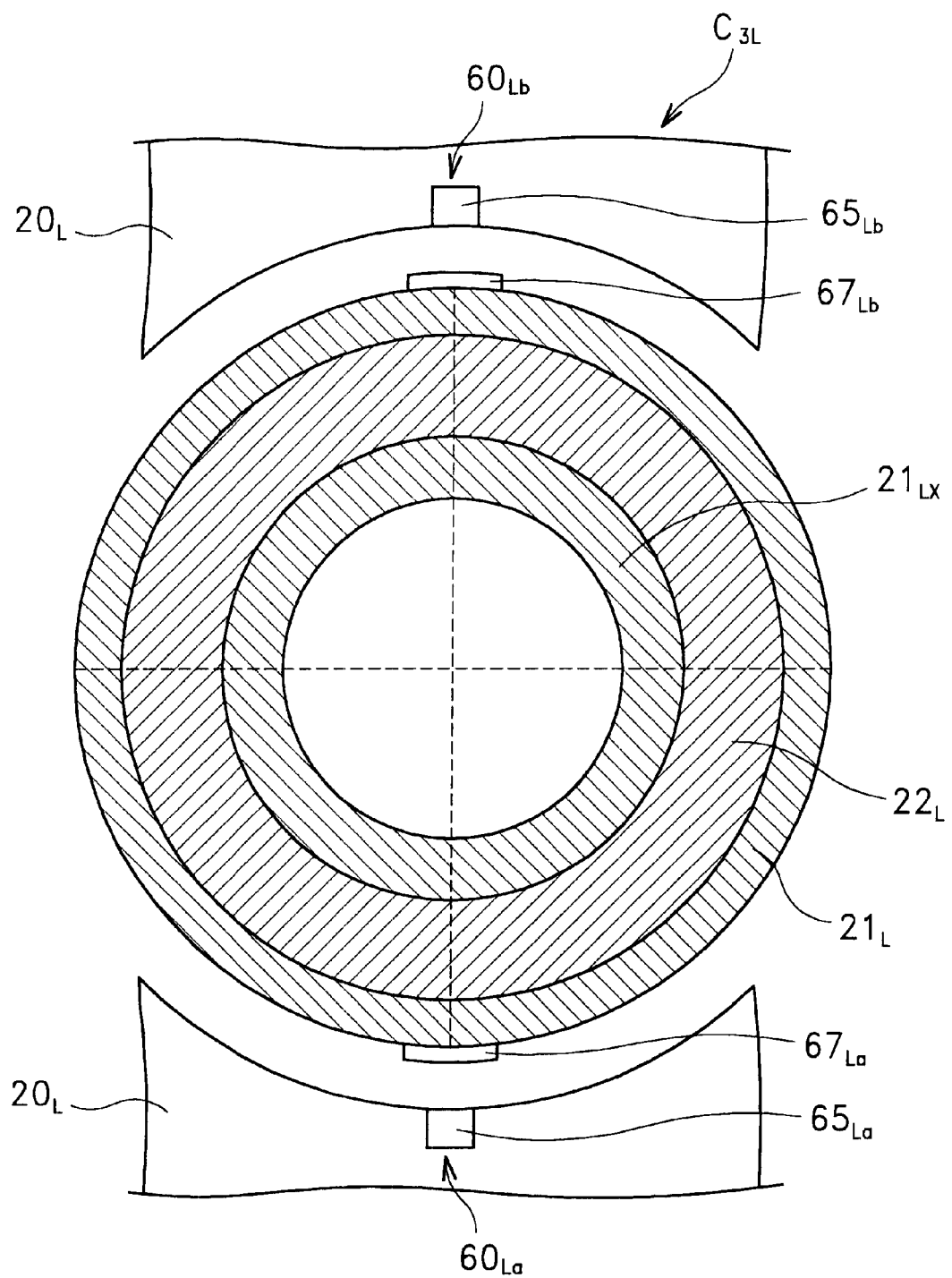
FIG. 23 is a plan view showing a clutch core of the electromagnetic clutch.
Figure 24:
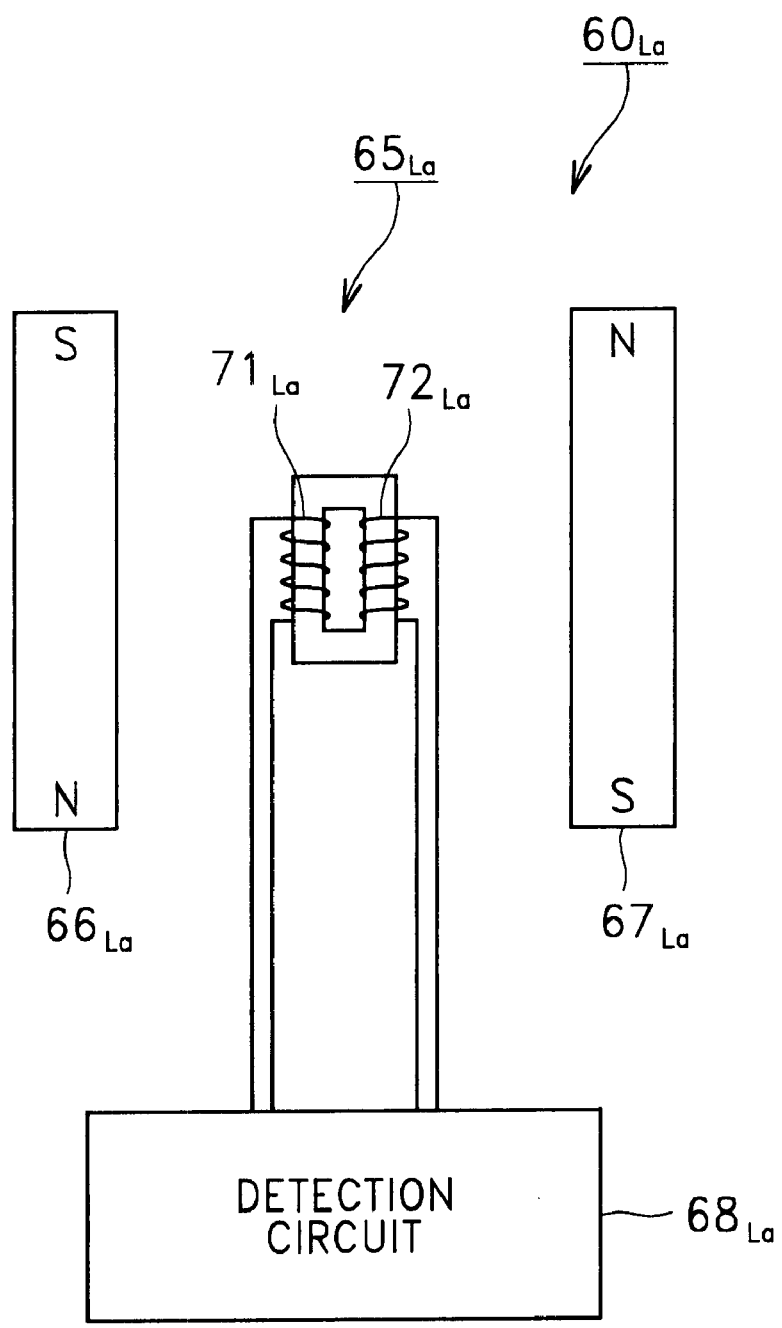
FIG. 24 is a schematic view showing the position detecting device mounted on the electromagnetic clutch.

As shown in FIGS. 22 to 24, in an electromagnetic clutch $C3_L$ of the present embodiment, two gap detecting units $60_{La}$, $60_{Lb}$ are provided in place of the sensor $24_L$ of the electromagnetic clutch $C1_L$ of the first embodiment. The electromagnetic clutch $C3_L$ is similar to the first embodiment except for the sensor $24_L$ and the high-frequency driving circuit $27_L$, the impedance detecting circuit $28_L$, the current control circuit $29_L$ and the impedance combining circuit $39_L$ which are connected with the sensor $24_L$. Therefore, the detailed description of the first embodiment is used here except for the gap detecting units $60_{La}$, $60_{Lb}$, and a control circuit $61_L$ and a current detecting circuit $62_L$ which are connected with the gap detecting units $60_{La}$, $60_{Lb}$.

Since the gap detecting units $60_{La}$, $60_{Lb}$ have the same structure, the structure of the gap detecting unit $60_{La}$ will be described here as a representative. The numerals of the constituent elements of the gap detecting unit $60_{Lb}$ are the same as those of the constituent elements of the gap detecting unit $60_{La}$ with their subscripts a replaced by b.

The electromagnetic clutch $C3_L$ has the two gap detecting units $60_{La}$, $60_{Lb}$. The gap detecting units $60_{La}$, $60_{Lb}$ are connected with the control circuit $61_L$ and the current detecting circuit $62_L$.

The gap detecting unit $60_{La}$ detects the relative position between the armature $23_L$ and the clutch core $21_L$.

The control circuit $61_L$ controls a current supplied to the exciting coil $22_L$ on the basis of the relative position between the armature $23_L$ and the clutch core $21_L$ detected from each gap detecting unit $60_{La}$ and the result of detection from the current detecting circuit $62_L$, which will be described later.

The current detecting circuit $62_L$ detects the current flowing through the exciting coil $22_L$ and supplies the result of the detection to the control circuit $61_L$.

Hereinafter, the gap detecting unit $60_{La}$ will be described in detail.

As shown in FIG. 24, the gap detecting unit $60_{La}$ has a position detecting part made up of a sensor $65_{La}$ and magnets $66_{La}$, $67_{La}$, and a detection circuit $68_{La}$. The magnets $66_{La}$, $67_{La}$ are mounted so as to move relatively to the sensor $65_{La}$. The detection circuit $68_{La}$ is connected with the sensor $65_{La}$.

The sensor $65_{La}$ senses a magnetic field from the magnets $66_{La}$, $67_{La}$, and outputs an electric signal.

Figure 25:
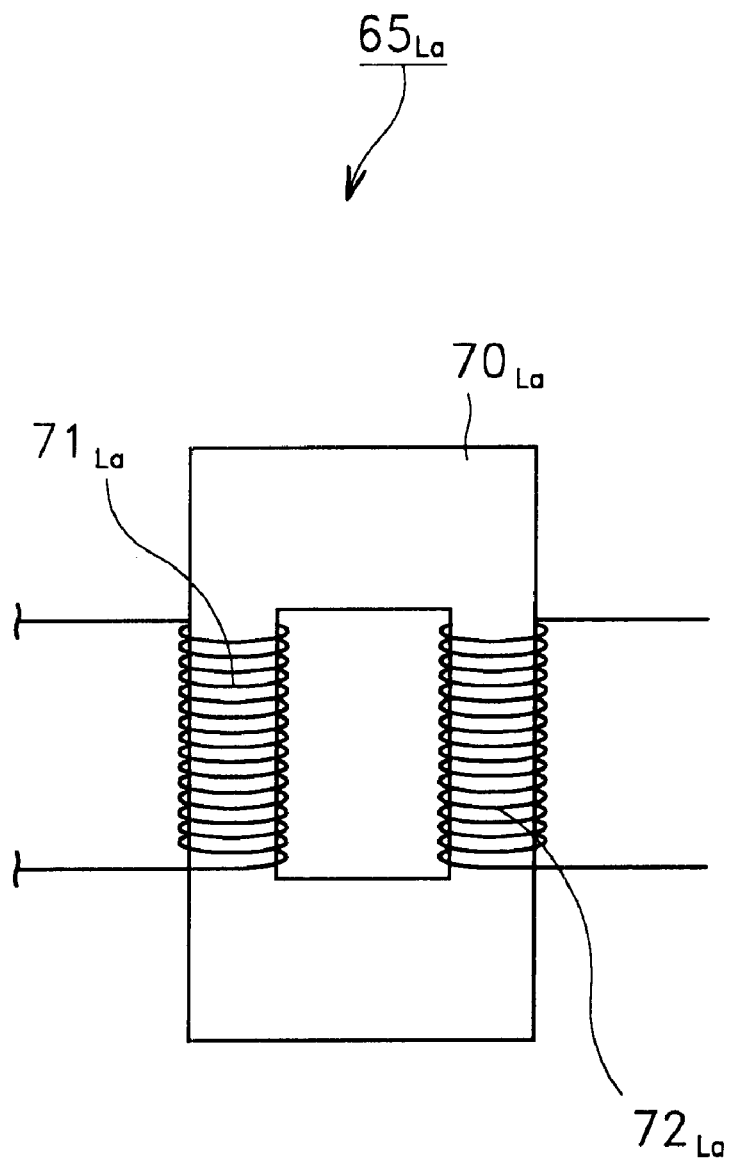
FIG. 25 is a plan view showing a sensor provided in the position detecting device.

The sensor $65_{La}$ is constituted by a rectangular ring-shaped sensor core $70_{La}$ forming a closed magnetic circuit, and two sensor coils $71_{La}$, $72_{La}$, wound on the sensor core $70_{La}$, as shown in FIG. 25. The sensor coils $71_{La}$, $72_{La}$, are wound on, for example, two facing sides in the longitudinal direction of the sensor core $70_{La}$.

The sensor core $70_{La}$ is made of a conductive magnetic material. It is preferred that the sensor core $70_{La}$ is made of a high permeable magnetic material such as permalloy or an amorphous metal containing Fe, Co, Si or B. As a high permeable magnetic material is used for the sensor core $70_{La}$, the sensor $65_{La}$ has a high sensitivity because of the saturation characteristic of the material.

The sensor coils $71_{La}$, $72_{La}$, are made of a conductive material. The sensor coils $71_{La}$, $72_{La}$ are formed, for example, by winding a Cu wire 50 times each on the two facing sides in the longitudinal direction of the sensor core $70_{La}$. In this embodiment, the Cu wire is wound on the sensor core $70_{La}$ so that the sensor coils $71_{La}$, $72_{La}$, form opposite spirals.

When, for example, a high-frequency pulse current flows through the sensor coils $71_{La}$, $72_{La}$, the sensor $65_{La}$ is excited. When the sensor coil $65_{La}$ senses a magnetic field in a magnetically sensitive direction, the impedance change of the sensor coils $71_{La}$, $72_{La}$ increases.

As the sensor core $70_{La}$ is rectangular ring-shaped and is electrified so that the sensor coils $71_{La}$, $72_{La}$ have the opposite phases, a magnetic flux generated on excitation by the sensor coils $71_{La}$, $72_{La}$ circulates in the sensor core $70_{La}$. Therefore, the sensor $65_{La}$ is efficiently excited and has a good sensitivity to the magnetic field from the magnets $66_{La}$, $67_{La}$. By taking a differential output from the two sensor coils $71_{La}$, $72_{La}$, the sensor $65_{La}$ generates an excellent signal output with less noise.

Figure 26:
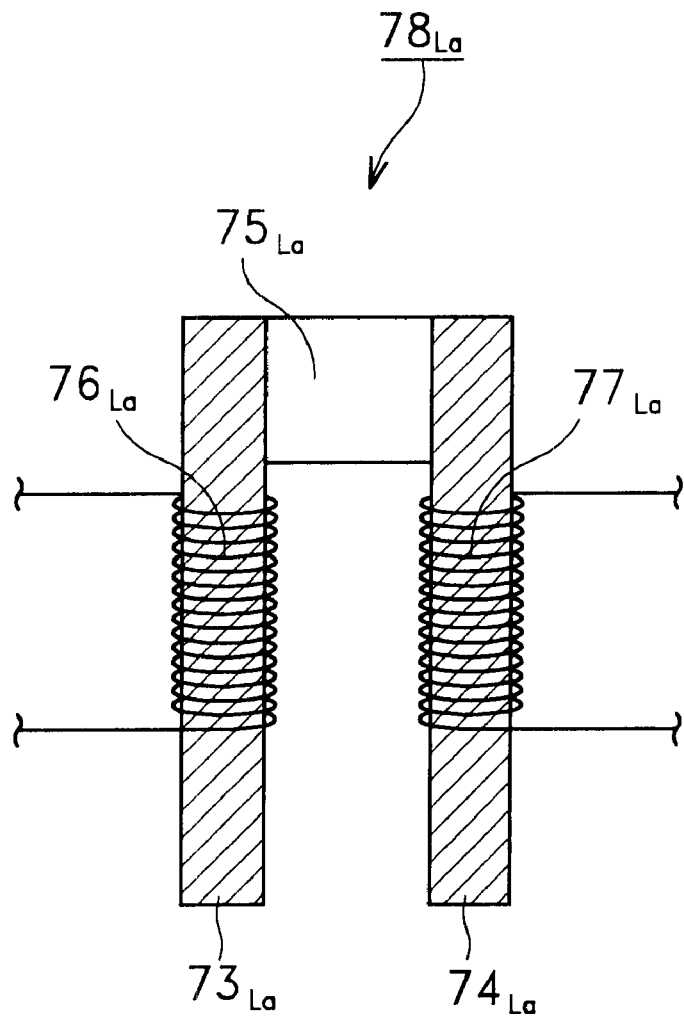
FIG. 26 is a plan view showing another example of the sensor.

The sensor may also have a shape shown in FIG. 26, depending on the specification and manufacturing cost. FIG. 26 shows a closed magnetic circuit-type sensor $78_{La}$ in which two substantially rectangular sensor cores $73_{La}$, $74_{La}$ made of a high permeable magnetic material are connected with each other at their respective ends by a substantially rectangular non-magnetic material $75_{La}$ and in which sensor coils $76_{La}$, $77_{La}$ are wound on the sensor cores $73_{La}$, $74_{La}$, respectively.

The magnets $66_{La}$, $67_{La}$ are magnetic field generating means and give a magnetic field which linearly changes in strength and direction as their positions relatively shift away from the sensor $65_{La}$. The magnets $66_{La}$, $67_{La}$ are provided on the armature $23_L$. In this case, the magnets $66_{La}$, $67_{La}$ are arranged so that their directions of magnetization are parallel and opposite to each other. As the magnets $66_{La}$, $67_{La}$ are arranged so that their directions of magnetization are opposite to each other, the magnetic field sensed by the sensor $65_{La}$ changes in direction as well as strength in accordance with the relative position between the sensor $65_{La}$ and the magnets $66_{La}$, $67_{La}$. Therefore, the gap detecting unit $60_{La}$ can accurately detect the relative position between the sensor $65_{La}$ and the magnets $66_{La}$, $67_{La}$, that is, the relative position between the armature $23_L$ and the clutch core $21_L$.

As the magnets $66_{La}$, $67_{La}$, permanent magnets made of barium ferrite, plastics or gum, permanent magnets produced by sintering SmCo, or electromagnets may be used. When electromagnets are used as the magnets $66_{La}$, $67_{La}$, the unevenness in the magnetic field which would be observed in the case of permanent magnets can be eliminated.

Figure 27:
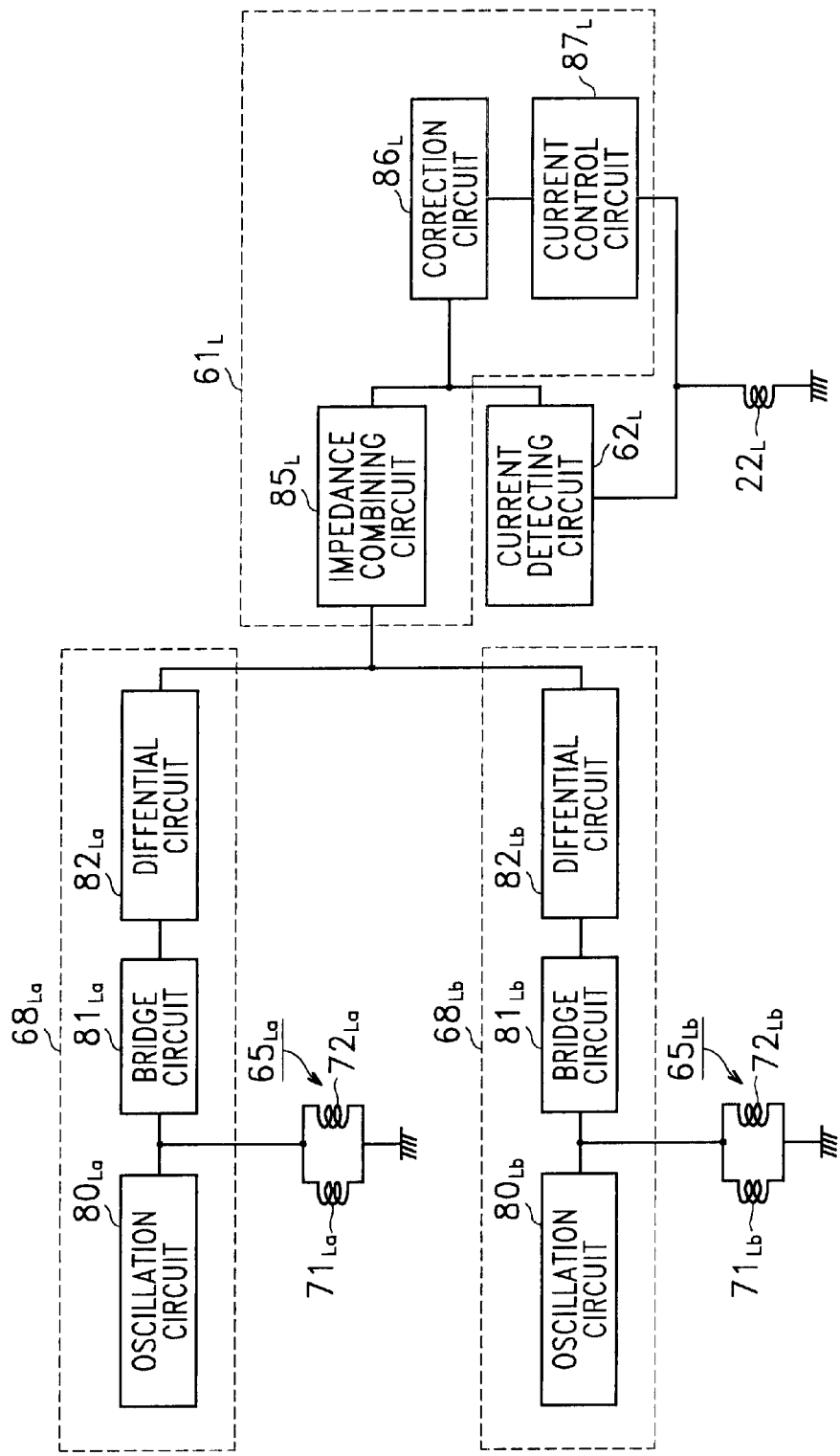
FIG. 27 is a circuit diagram of the electromagnetic clutch.

The detection circuit $68_{La}$ is connected with the sensor coils $71_{La}$, $72_{La}$, as shown in FIG. 27. The detection circuit $68_{La}$ is constituted by an oscillation circuit $80_{La}$ for driving the sensor $65_{La}$, a bridge circuit $81_{La}$ for detecting an electric signal from the sensor $65_{La}$, and a differential circuit $82_{La}$ for obtaining a differential output of the bridge circuit $81_{La}$. The oscillation circuit $80_{La}$ is oscillation means for exciting the sensor coils $71_{La}$, $72_{La}$ at a high frequency. The bridge circuit $81_{La}$ and the differential circuit $82_{La}$ detect the impedance of the sensor coils $71_{La}$, $72_{La}$. On the basis of the impedance, the relative position between the sensor $65_{La}$ and the magnets $66_{La}$, $67_{La}$ can be detected.

By attaching the sensor $65_{La}$ to the housing $20_L$ and attaching the magnets $66_{La}$, $67_{La}$ to the armature $23_L$, as shown in FIG. 22, it is possible to detect the relative distance between the housing $20_L$ and the armature $23_L$. In this case, since there is no relative movement between the housing $20_L$ and the clutch core $21_L$, it is possible to detect the relative position between the armature $23_L$ and the clutch core $21_L$. The detection circuit $68_{La}$ supplies the detected signal to the control circuit $61_L$.

The control circuit $61_L$ will now be described in detail.

The control circuit $61_L$ has an impedance combining circuit $85_L$, a correction circuit $86_L$, and a current control circuit $87_L$, as shown in FIG. 27.

The impedance combining circuit $85_L$ combines the impedance supplied from the two detection circuits $68_{La}$, $68_{Lb}$ and supplies the result of the combination to the correction circuit $86_L$.

The correction circuit $86_L$ corrects a target current for the electromagnetic clutch $C3_L$ to have a predetermined connecting force, on the basis of the result supplied from the impedance combining circuit $85_L$ and the result supplied from the current detecting circuit $62_L$, and supplies the result of the correction to the current control circuit $87_L$.

The current control circuit $87_L$ controls the current supplied to the exciting coil $22_L$ on the basis of the result supplied from the correction circuit $86_L$.

In the electromagnetic clutch $C3_L$, the two sensors $65_{La}$, $65_{Lb}$ are mounted on the housing $20_L$, and the magnets $66_{La}$, $67_{La}$, $66_{Lb}$, $67_{Lb}$ are mounted on the armature $23_L$. In this case, the sensor $65_{La}$ and the magnets $66_{La}$, $67_{La}$ are arranged to face each other, and the sensor $65_{Lb}$ and the magnets $66_{Lb}$, $67_{Lb}$ are arranged to face each other.

When the electromagnetic clutch $C3_L$ is connected, the target current is caused to flow through the exciting coil $22_L$ so as to realize a predetermined connecting force. In this case, the gap detecting unit $60_{La}$ measures the gap between the clutch core $21_L$ and the armature $23_L$ at two positions and electric signals corresponding to the gaps at the two positions are outputted from the sensor $65_{La}$, $65_{Lb}$. Then, the electric signals are supplied to the bridge circuits $81_{La}$, $81_{Lb}$ and the differential circuits $82_{La}$, $82_{Lb}$. The bridge circuit $81_{La}$ and the differential circuit $82_L$ obtain a differential output of the sensor coils $71_{La}$ and $72_{La}$. The bridge circuit $81_{Lb}$ and the differential circuit $82_{Lb}$ obtain a differential output of the sensor coils $71_{Lb}$ and $72_{Lb}$.

The differential outputs detected by the two gap detecting units $60_{La}$, $60_{Lb}$ are supplied to the control circuit $61_L$. In the control circuit $61_L$, the impedance combining circuit $85_L$ combined the two impedance supplied thereto. The result of the combination is supplied to the correction circuit $86_L$. The correction circuit $86_L$ corrects the target current on the basis of the result of the combination supplied from the impedance combining circuit $85_L$ and the result supplied from the current control circuit $87_L$. The result of the correction is supplied to the current control circuit $87_L$. The current control circuit $87_L$ controls the current supplied to the exciting coil $22_L$ in accordance with the result of the correction. As the corrected current is caused to flow to the exciting coil $22_L$, a predetermined attracting force is achieved as the attracting force of the armature $23_L$ to the clutch core $21_L$. That is, the electromagnetic clutch $C3_L$ is connected by a predetermined connecting force.

With respect to this electromagnetic clutch $C3_L$, the relation between the inclination of the armature $23_L$ and the result of the combination of the electric signals outputted from the sensors $65_{La}$, $65_{Lb}$ was examined. The electric signal outputted from the sensor $65_{La}$ represents the differential output of the electric signals outputted from the sensor coils $71_{La}$, $72_{La}$. The electric signal outputted from the sensor $65_{Lb}$ represents the differential output of the electric signals outputted from the sensor coils $71_{Lb}$, $72_{Lb}$.

Specifically, there was provided a difference between a gap g1 between the armature $23_L$ and the clutch core $21_L$ at the position where the sensor $65_{La}$ was arranged and a gap g2 between the armature $23_L$ and the clutch core $21_L$ at the position where the sensor $65_{Lb}$ was arranged. The electric signals outputted from the sensors $65_{La}$, $65_{Lb}$ were combined by the impedance combining circuit $85_L$ in accordance with the difference ($\Delta$) between g1 and g2, and the result of the combination was measured. The result is shown in FIG. 28.

Figure 28:
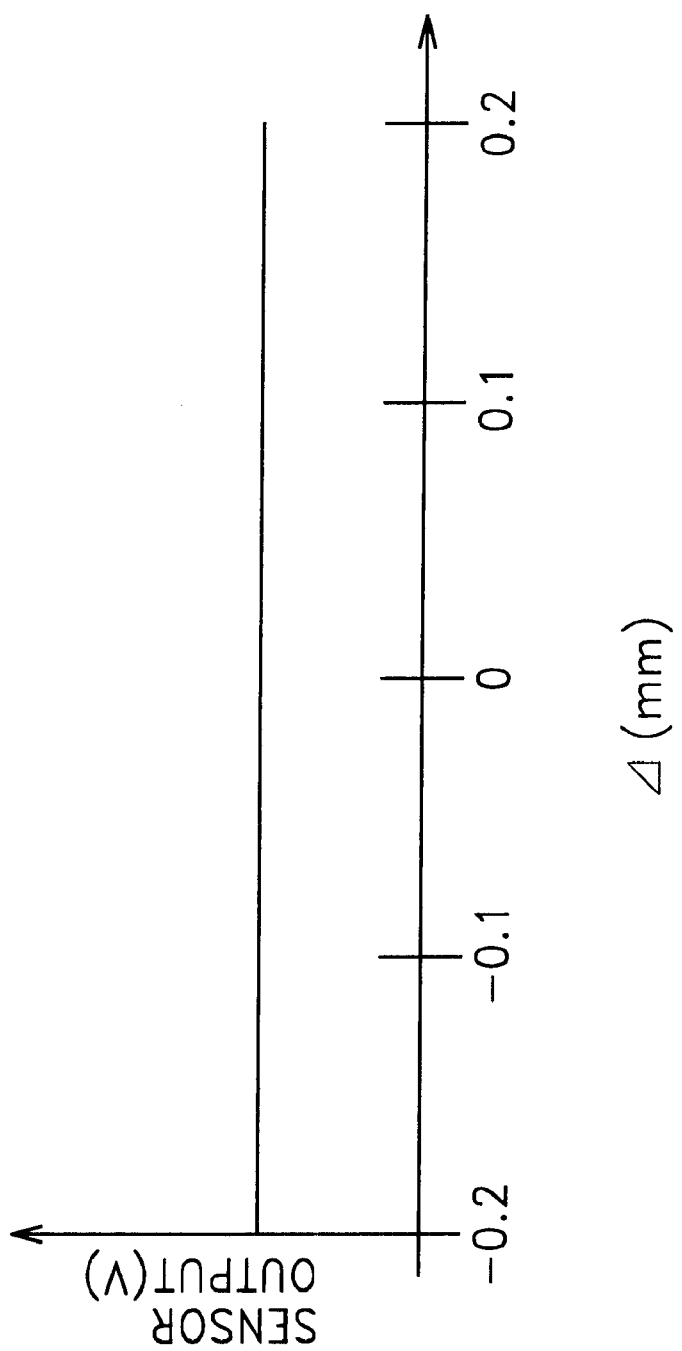
FIG. 28 shows an output from the sensor in the electromagnetic clutch.
Figure 29:
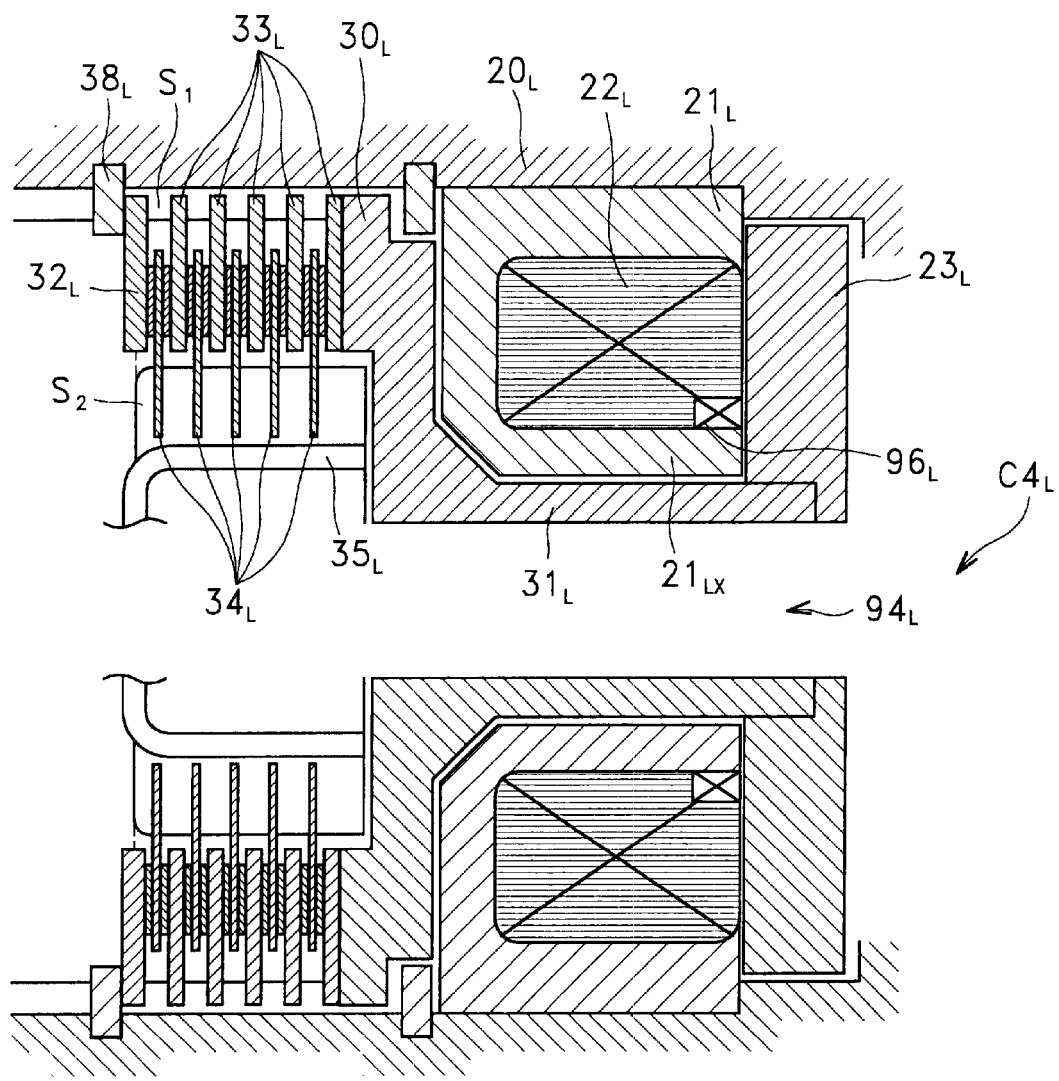
FIG. 29 is a side view showing still another electromagnetic clutch to which the present invention is applied and in which a sensor of a position detecting device is provided in the entire circumferential direction.
Figure 30:
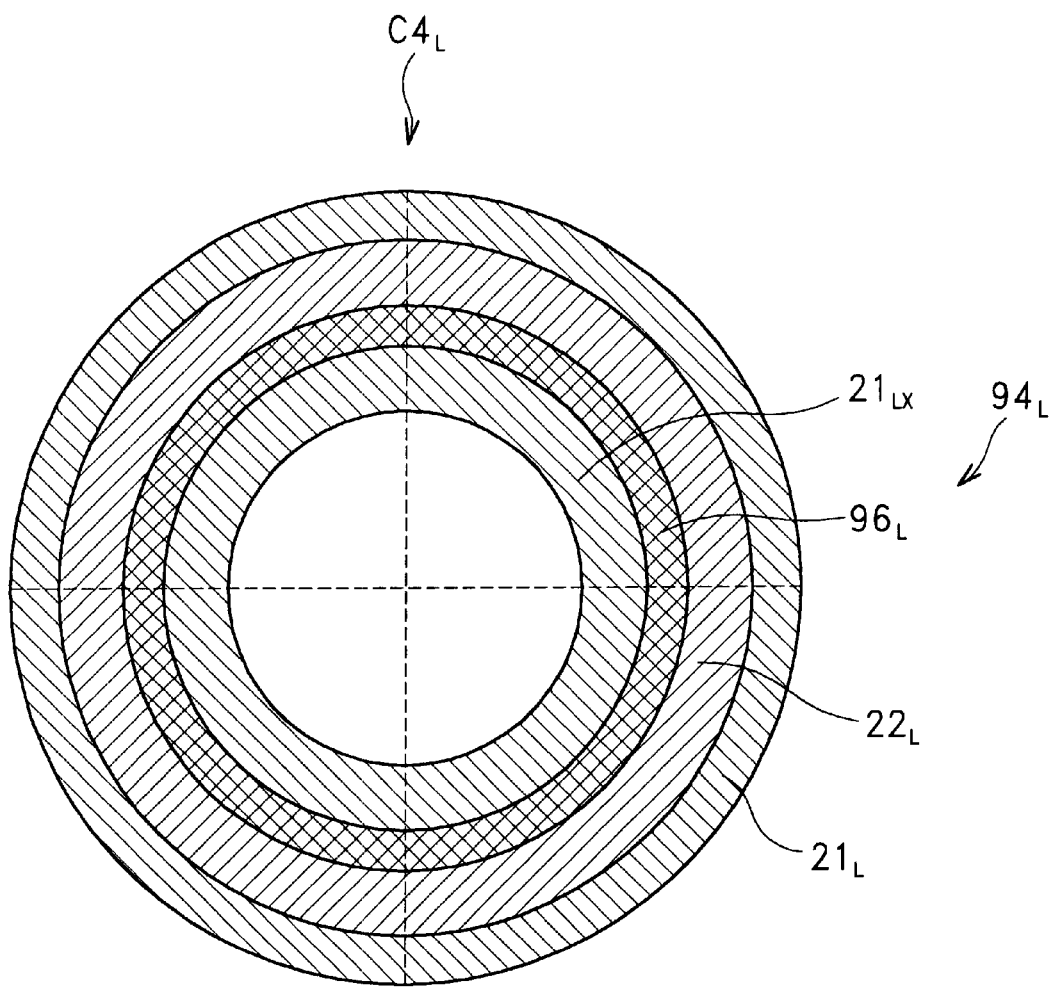
FIG. 30 is a plan view showing a clutch core of the electromagnetic clutch.

From FIG. 28, it is understood that in the electromagnetic clutch $C3_L$ having the two sensors $65_{La}$, $65_{Lb}$, the change of the electric signals outputted from the sensors is constant irrespective of the difference between g1 and g2. That is, in the electromagnetic clutch $C3_L$, the attracting force can be accurately controlled even when the armature $23_L$ is inclined with respect to the clutch core $21_L$.

As is described above, in the electromagnetic clutch $C3_L$ to which the present invention is applied, since the two gap detecting units $60_{La}$, $60_{Lb}$ are provided, the relative position between the armature $23_L$ and the core clutch $21_L$ is detected at two positions within the electromagnetic clutch $C3_L$. Moreover, the control circuit $61_L$ adjusts the current supplied to the exciting coil on the basis of the result of the combination of the detected relative positions.

Therefore, in the electromagnetic clutch $C3_L$, the attracting force of the armature $23_L$ to the clutch core $21_L$ can be accurately measured even when the armature $23_L$ is inclined with respect to the clutch core $21_L$ and is attracted thereto in the inclined state. That is, in the electromagnetic clutch $C3_L$, the connecting force can be accurately controlled even when the armature $23_L$ is inclined with respect to the clutch core $21_L$ and is attracted thereto in the inclined state.

While the two gap detecting units $60_L$ are provided in the electromagnetic clutch in the present embodiment, it is preferable that a greater number of the gap detecting units $60_L$ are provided on the clutch core $21_L$. In this case, it is preferable that the respective position detecting parts are arranged to detect the distance between the clutch core $21_L$ and the armature $23_L$ at different positions on the surface of the clutch core $21_L$ facing the armature $23_L$.

Three gap detecting units $60_L$ are most preferably provided in the electromagnetic clutch $C3_L$. By providing the three gap detecting unit $60_L$, it is possible to accurately control the inclination of the armature $23_L$ with respect to the clutch core $21_L$ with a minimum number of gap detecting units $60_L$. Moreover, it is preferred that the respective position detecting parts are separated away from one another by 120 degrees.

Fourth Embodiment

A fourth embodiment of the electromagnetic clutch $C_L$ to which the present invention is applied will now be described with reference to FIGS. 29 to 32.

An electromagnetic clutch $C4_L$ of the present embodiment has a structure in which a gap detecting unit $90_L$ is provided in place of the sensor $24_L$ in the electromagnetic clutch $C1_L$ of the first embodiment. The electromagnetic clutch $C4_L$ is similar to the first embodiment except for the sensor $24_L$, and the high-frequency driving circuit $27_L$, the impedance detecting circuit $28_L$, the impedance combining circuit $29_L$ and the current control circuit $29_L$ connected with the sensor $24_L$. Therefore, the detailed description of the first embodiment is used here except for the gap detecting unit $90_L$, and a control circuit $91_L$ and a current detecting circuit $92_L$ connected with the gap detecting unit $90_L$.

Figure 31:
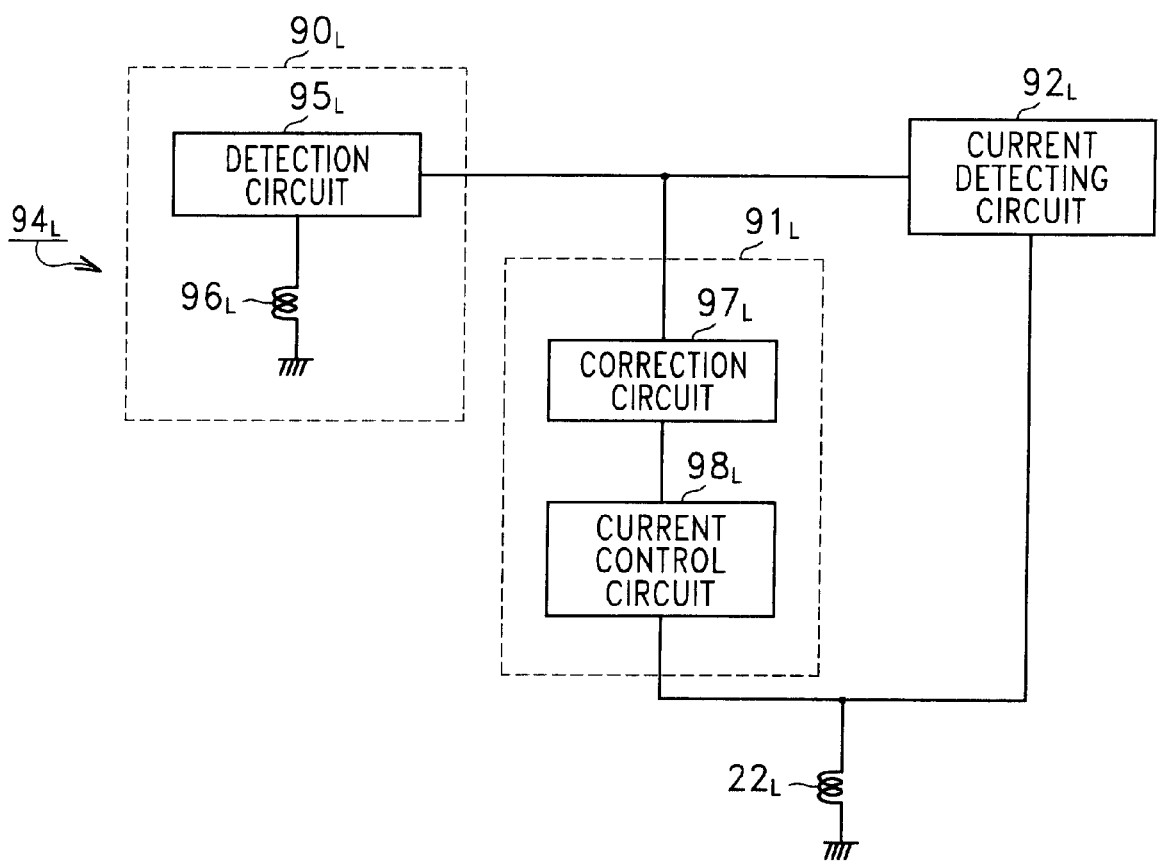
FIG. 31 is a circuit diagram of the electromagnetic clutch.

In the electromagnetic clutch $C4_L$ to which the present embodiment is applied, the gap detecting unit $90_L$ is provided as shown in FIG. 31. The gap detecting unit $90_L$ is connected with the control circuit $91_L$ and the current detecting circuit $92_L$.

The gap detecting unit $90_L$ detects the relative position between the armature $23_L$ and the clutch core $21_L$.

The control circuit $91_L$ controls the current supplied to the exciting coil $22_L$ on the basis of the relative position between the armature $23_L$ and the clutch core $21_L$ detected by the gap detecting unit $90_L$.

The current detecting circuit $92_L$ detects the current flowing through the exciting coil $22_L$ and supplies the result of the detection to the control circuit $91_L$.

The gap detecting unit $90_L$ has a sensor $94_L$ and a detection circuit $95_L$. The detection circuit $95_L$ is made up of the high-frequency driving circuit $27_L$ and the impedance detecting circuit $28_L$ which are described in the second embodiment. Therefore, the description of these circuits is used here for the detection circuit $95_L$.

The sensor $94_L$ changes the impedance in accordance with a reflection magnetic field caused by an eddy current generated from the armature $23_L$. The impedance change of the sensor $94_L$ varies in accordance with the distance between the clutch core $21_L$ and the armature $23_L$, as will be later described in detail.

The sensor $94_L$ is constituted by winding a sensor coil $96_L$ on the protrusion $21_{LX}$ of the clutch core $21_L$. Specifically, the exciting coil $22_L$ is first wound on the protrusion $21_{LX}$ and then the sensor coil $96_L$ is wound on the exciting coil $22_L$. The sensor coil $96_L$ is connected with the detection circuit $95_L$. The sensor $94_L$ is driven, for example, when a high-frequency pulse current flows through the sensor coil $96_L$.

The control circuit $91_L$ has a correction circuit $97_L$ and a current control circuit $98_L$.

The correction circuit $97_L$ corrects a target current for the electromagnetic clutch $C4_L$ to have a predetermined connecting force, on the basis of the electric signal outputted from the sensor $94_L$ and the result supplied from the current detecting circuit $92_L$, and supplies the result of the correction to the current control circuit $98_L$.

The current control circuit $98_L$ controls the current supplied to the exciting coil $22_L$ on the basis of the result supplied from the correction circuit $97_L$.

When this electromagnetic clutch $C4_L$ is connected, the target current to achieve a predetermined connecting force is caused to flow through the exciting roil $22_L$. In this case, the gap detecting unit $90_L$ measures the gap between the clutch core $21_L$ and the armature $23_L$, and an electric signal corresponding to the gap is outputted from the sensor coil $96_L$. Then, the impedance of the sensor coil $96_L$ is detected by the detection circuit $95_L$.

The impedance detected by the detection circuit $95_L$ is supplied to the control circuit $91_L$. In the control circuit $91_L$ the correction circuit $97_L$ corrects the target current supplied to the exciting coil $22_L$ on the basis of the impedance supplied from the gap detecting unit $90_L$ and the result supplied from the current control circuit $98_L$. The result of the correction is supplied to the current control circuit $98_L$. The current control circuit $98_L$ controls the current supplied to the exciting coil $22_L$ in accordance with the result of the correction. As the corrected current is caused to flow to the exciting coil $22_L$, a predetermined attracting force is achieved as the attracting force of the armature $23_L$ to the clutch core $21_L$. That is, the electromagnetic clutch $C4_L$ is connected by a predetermined connecting force.

The method for detecting the relative position between the armature $23_L$ and the clutch core $21_L$ by having the sensor $94_L$ sense a magnetic field generated from the armature $23_L$ will now be described.

In this case, it is preferred that the armature $23_L$ is made of a conductive material.

First, when the sensor $94_L$ is driven at a high frequency, the armature $23_L$ arranged to face the sensor $94_L$ is excited at a high frequency by the sensor $94_L$. Thus, an eddy current is generated in the armature $23_L$. When the eddy current is generated in the armature $23_L$, an impedance loss with a phase difference of 180 degrees from the driving wave is generated in the sensor $94_L$ by a reflection magnetic field due to the eddy current generated in the armature $23_L$. The impedance loss due to the eddy current varies depending upon the magnitude of the reflection magnetic field from the armature $23_L$ sensed by the sensor $94_L$. This impedance changes greatly with the distance between the sensor $94_L$ and the armature $23_L$, that is, the distance between the clutch core $21_L$ and the armature $23_L$.

Specifically, when the sensor $94_L$ senses the magnetic field due to the eddy current generated in the armature $23_L$, the impedance of the sensor coil $96_L$ changes. The impedance changes with the relative position between the armature $23_L$ and the clutch core $21_L$. Therefore, by detecting the impedance, the relative position between the armature $23_L$ and the clutch core $21_L$ can be detected.

With respect to the electromagnetic clutch $C4_L$, the relation between the inclination of the armature $23_L$ and the electric signal outputted from the sensor $94_L$ was examined. The electric signal outputted from the sensor $94_L$ represents the electric signal outputted from the sensor coil $96_L$.

Specifically, one point $23_{La}$ of the armature $23_L$ was placed in contact with the clutch core $21_L$ as shown in FIGS. 9A to 9D. Then, the armature $23_L$ was rotated so that the point in contact moved 360 degrees, and an electric signal outputted from the detection circuit $95_L$ was measured. The result is shown in FIG. 32.

Figure 32:
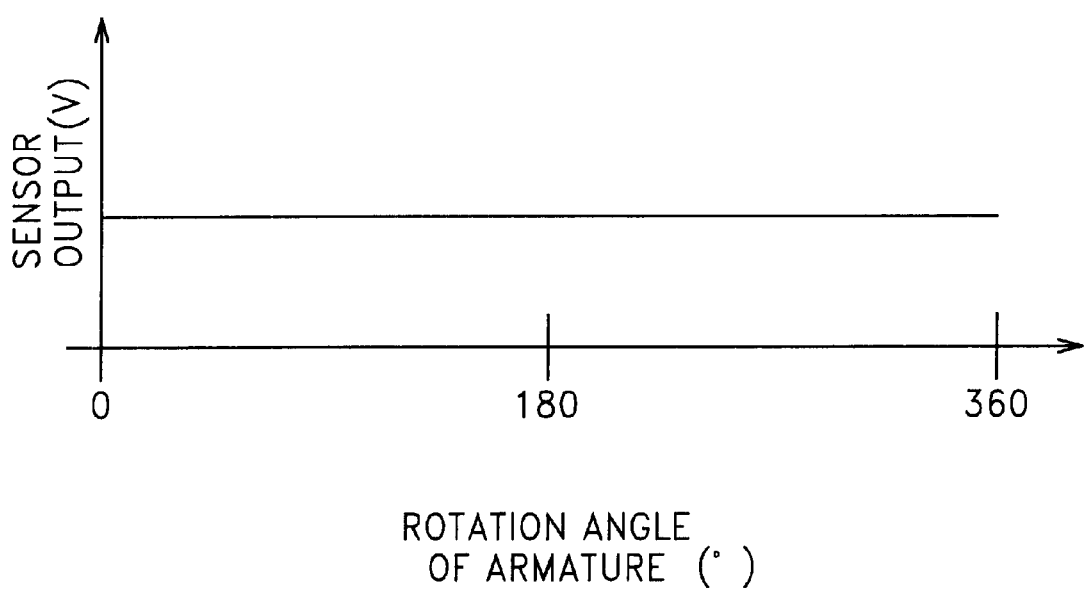
FIG. 32 shows an output from the sensor in the electromagnetic clutch.

From FIG. 32, it is understood that in the electromagnetic clutch $C4_L$, the change of the electric signal outputted from the sensor $94_L$ is constant irrespective of the inclination of the armature $23_L$. That is, in the electromagnetic clutch $C4_L$, the attracting force can be accurately controlled even when the armature $23_L$ is inclined with respect to the clutch core $21_L$.

As is described above, in the electromagnetic clutch $C4_L$, the sensor $94_L$, which is the position detecting part, is provided on the entire circumference in the circumferential direction of the clutch core $21_L$. That is, the gap detecting unit $90_L$ detects the relative position between the armature $23_L$ and the clutch core $21_L$ in a predetermined area including the center on the one major surface of the clutch core $21_L$ facing the armature $23_L$. On the basis of the detected relative position, the control circuit $91_L$ controls the current supplied to the exciting coil $22_L$.

Therefore, in the electromagnetic clutch $C4_L$, the attracting force of the armature $23_L$ to the clutch core $21_L$ can be accurately measured even when the armature $23_L$ is inclined with respect to the clutch core $21_L$ and is attracted thereto in the inclined state. That is, in the electromagnetic clutch $C4_L$, the connecting force can be accurately controlled even when the armature $23_L$ is inclined with respect to the clutch core $21_L$ and is attracted thereto in the inclined state.

What is claimed is:

1. An electromagnetic clutch comprising:

a core made of a magnetic material;

an exciting coil for exciting the core;

an armature arranged at a position facing one major surface of the core and adapted for being attracted to the core by a predetermined connecting force in accordance with a current supplied to the exciting coil;

a plurality of magnetic flux measuring means, each having magnetically sensitive means and adapted for measuring a magnetic flux quantity of a magnetic circuit including the core and the armature; and control means for controlling the current flowing through the exciting coil in accordance with a result of the measurement by each of the magnetic flux measuring means and setting a predetermined connecting force as the connecting force of the armature to the core;

each of the magnetically sensitive means being provided in a circumferential direction so that the magnetic flux density of the magnetic circuit is controlled in accordance with an output signal from each magnetically sensitive means.

* * * * *

UNITED STATES PATENT AND TRADEMARK OFFICE
CERTIFICATE OF CORRECTION

PATENT NO. : 6,668,996 B2
DATED : December 30, 2003
INVENTOR(S) : Yasuo Nekada et al.

It is certified that error appears in the above-identified patent and that said Letters Patent is hereby corrected as shown below:

<u>Title page,</u>
Item [75], Inventors, delete "Shinji Ohkuma, Saitama (JP);" and "; Shinichi Inagawa, Saitama (JP)".

Signed and Sealed this

Twenty-third Day of March, 2004

JON W. DUDAS
*Acting Director of the United States Patent and Trademark Office*